United States Patent
Demmer et al.

(10) Patent No.: US 8,473,620 B2
(45) Date of Patent: Jun. 25, 2013

(54) INTERCEPTION OF A CLOUD-BASED COMMUNICATION CONNECTION

(75) Inventors: Michael J. Demmer, San Francisco, CA (US); Kand Ly, Richmond, CA (US); Nitin Gupta, Fremont, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 246 days.

(21) Appl. No.: 12/843,754

(22) Filed: Jul. 26, 2010

(65) Prior Publication Data

US 2010/0318665 A1   Dec. 16, 2010

Related U.S. Application Data

(63) Continuation-in-part of application No. 10/640,405, filed on Aug. 12, 2003, now Pat. No. 8,069,225.

(60) Provisional application No. 60/462,990, filed on Apr. 14, 2003.

(51) Int. Cl.
 *G06F 15/16* (2006.01)
(52) U.S. Cl.
 USPC .......................................................... 709/227
(58) Field of Classification Search
 USPC .................. 709/203, 213, 219, 238, 228, 229
 See application file for complete search history.

(56) References Cited

U.S. PATENT DOCUMENTS

| | | |
|---|---|---|
| 6,094,485 A | 7/2000 | Weinstein et al. |
| 6,104,716 A | 8/2000 | Crichton et al. |
| 6,105,067 A | 8/2000 | Batra |
| 6,526,131 B1 | 2/2003 | Zimmerman et al. |
| 6,584,567 B1 | 6/2003 | Bellwood et al. |
| 6,643,701 B1 | 11/2003 | Aziz et al. |
| 6,658,114 B1 | 12/2003 | Farn et al. |
| 6,681,327 B1 | 1/2004 | Jardin |
| 6,704,798 B1 | 3/2004 | Mogul |

(Continued)

FOREIGN PATENT DOCUMENTS

| | | |
|---|---|---|
| EP | 1533982 A2 | 5/2005 |
| WO | 0103398 A2 | 1/2001 |
| WO | 0137068 A2 | 5/2001 |
| WO | 2005060202 A1 | 6/2005 |

OTHER PUBLICATIONS

Dierks et al., "The Transport Layer Security (TLS) Protocol Version 1.2", Network Working Group Request for Comments: 5246 (Aug. 2008).

(Continued)

*Primary Examiner* — Dustin Nguyen
(74) *Attorney, Agent, or Firm* — Park, Vaughan, Fleming & Dowler, LLP

(57) ABSTRACT

Methods and apparatus are provided for intercepting a client-server communication connection in a computing environment. A first network intermediary configured to facilitate optimization of client-server transactions may be installed in a path of communications between the client and the server. A second network intermediary configured to cooperate with the first network intermediary is not in the path of communications between the client and the server. The first network intermediary intercepts a connection request from the client and forwards a modified request toward the server. A module within the server intercepts the connection request and redirects it to the second network intermediary. The client-server connection is thus split-terminated at the two network intermediaries, which establish cooperative sessions between themselves and with the client and with the server.

20 Claims, 19 Drawing Sheets

U.S. PATENT DOCUMENTS

| | | |
|---|---|---|
| 6,728,884 B1 | 4/2004 | Lim |
| 6,799,270 B1 | 9/2004 | Bull et al. |
| 6,918,041 B1 | 7/2005 | Chen |
| 6,996,841 B2 | 2/2006 | Kadyk et al. |
| 7,007,163 B2 | 2/2006 | Tardo et al. |
| 7,010,608 B2 | 3/2006 | Garg et al. |
| 7,073,066 B1 | 7/2006 | Nessett |
| 7,082,535 B1 | 7/2006 | Norman et al. |
| 7,120,666 B2 | 10/2006 | McCanne et al. |
| 7,146,505 B1 | 12/2006 | Harada et al. |
| 7,174,565 B2 | 2/2007 | Kadyk et al. |
| 7,219,120 B2 | 5/2007 | Hui |
| 7,240,366 B2 | 7/2007 | Buch et al. |
| 7,343,398 B1 | 3/2008 | Lownsbrough |
| 7,370,351 B1 | 5/2008 | Ramachandran et al. |
| 7,401,159 B1 * | 7/2008 | Aviani et al. .............. 709/238 |
| 7,421,735 B2 | 9/2008 | Kerstens et al. |
| 7,502,726 B2 | 3/2009 | Panasyuk et al. |
| 7,506,369 B2 | 3/2009 | Buch et al. |
| 7,543,146 B1 | 6/2009 | Karandikar et al. |
| 7,568,114 B1 | 7/2009 | Schlafly |
| 7,647,404 B2 | 1/2010 | Cooper et al. |
| 7,661,131 B1 | 2/2010 | Shaw et al. |
| 7,770,007 B2 | 8/2010 | Bobde et al. |
| 7,827,405 B2 | 11/2010 | Christiansen et al. |
| 7,853,699 B2 | 12/2010 | Wu et al. |
| 7,865,720 B2 | 1/2011 | Little et al. |
| 7,895,446 B2 | 2/2011 | Harada et al. |
| 7,904,949 B2 | 3/2011 | Bowers et al. |
| 7,958,347 B1 | 6/2011 | Ferguson |
| 7,979,555 B2 | 7/2011 | Rothstein et al. |
| 7,984,160 B2 | 7/2011 | Lam |
| 7,996,886 B1 | 8/2011 | Hughes et al. |
| 8,020,201 B2 | 9/2011 | Adusumilli et al. |
| 8,176,186 B2 | 5/2012 | McCanne et al. |
| 8,266,452 B2 | 9/2012 | Dunn et al. |
| 2001/0047474 A1 | 11/2001 | Takagi et al. |
| 2002/0016911 A1 | 2/2002 | Chawla et al. |
| 2002/0023145 A1 * | 2/2002 | Orr et al. .............. 709/219 |
| 2002/0035681 A1 | 3/2002 | Maturana et al. |
| 2002/0069241 A1 * | 6/2002 | Narlikar et al. .............. 709/203 |
| 2002/0157019 A1 | 10/2002 | Kadyk et al. |
| 2002/0163884 A1 | 11/2002 | Peles et al. |
| 2002/0165928 A1 * | 11/2002 | Landfeldt et al. .............. 709/213 |
| 2003/0005280 A1 | 1/2003 | Bobde et al. |
| 2003/0014628 A1 | 1/2003 | Freed et al. |
| 2003/0014650 A1 | 1/2003 | Freed et al. |
| 2003/0105810 A1 * | 6/2003 | McCrory et al. .............. 709/203 |
| 2003/0196084 A1 | 10/2003 | Okereke et al. |
| 2003/0200332 A1 * | 10/2003 | Gupta et al. .............. 709/238 |
| 2003/0233539 A1 | 12/2003 | Tardo et al. |
| 2004/0010596 A1 | 1/2004 | Hui |
| 2004/0015725 A1 | 1/2004 | Boneh et al. |
| 2004/0088542 A1 | 5/2004 | Daude et al. |
| 2004/0243703 A1 | 12/2004 | Demmer et al. |
| 2005/0001660 A1 | 1/2005 | Roy |
| 2005/0008158 A1 | 1/2005 | Huh et al. |
| 2005/0021956 A1 | 1/2005 | Genty et al. |
| 2005/0050316 A1 | 3/2005 | Peles |
| 2005/0060426 A1 * | 3/2005 | Samuels et al. .............. 709/238 |
| 2005/0065799 A1 | 3/2005 | Dare et al. |
| 2005/0081029 A1 | 4/2005 | Thornton et al. |
| 2005/0108517 A1 | 5/2005 | Dillon et al. |
| 2005/0138353 A1 | 6/2005 | Spies et al. |
| 2005/0138359 A1 | 6/2005 | Simon et al. |
| 2005/0144463 A1 | 6/2005 | Rossebo et al. |
| 2005/0240777 A1 | 10/2005 | Keohane et al. |
| 2005/0265327 A1 | 12/2005 | Buch et al. |
| 2006/0069719 A1 | 3/2006 | McCanne et al. |
| 2006/0143702 A1 | 6/2006 | Hisada et al. |
| 2006/0168210 A1 | 7/2006 | Ahonen et al. |
| 2006/0174106 A1 | 8/2006 | Bell et al. |
| 2006/0190612 A1 | 8/2006 | Kahol et al. |
| 2006/0209789 A1 | 9/2006 | Gupta et al. |
| 2007/0038853 A1 | 2/2007 | Day |
| 2007/0058807 A1 | 3/2007 | Marsh |
| 2007/0074282 A1 | 3/2007 | Black et al. |
| 2007/0199061 A1 | 8/2007 | Byres et al. |
| 2008/0046714 A1 | 2/2008 | Suganthi et al. |
| 2008/0060055 A1 | 3/2008 | Lau |
| 2008/0077982 A1 | 3/2008 | Hayler et al. |
| 2008/0115200 A1 | 5/2008 | Olson et al. |
| 2008/0126794 A1 | 5/2008 | Wang et al. |
| 2008/0126801 A1 | 5/2008 | Lee et al. |
| 2008/0263215 A1 | 10/2008 | Schnellbaecher |
| 2008/0307219 A1 | 12/2008 | Karandikar |
| 2009/0013399 A1 | 1/2009 | Cottrell et al. |
| 2009/0083537 A1 | 3/2009 | Larsen et al. |
| 2009/0083538 A1 | 3/2009 | Merugu et al. |
| 2009/0089862 A1 | 4/2009 | Sun |
| 2009/0113537 A1 | 4/2009 | Woo |
| 2009/0119504 A1 | 5/2009 | Van Os et al. |
| 2009/0220080 A1 | 9/2009 | Herne et al. |
| 2010/0031337 A1 | 2/2010 | Black et al. |
| 2010/0049970 A1 | 2/2010 | Fraleigh et al. |
| 2010/0071048 A1 | 3/2010 | Novak et al. |

OTHER PUBLICATIONS

Larsen, Case Thomas et al "Server Configuration Selection for SSL Interception", U.S. Appl. No. 11/489,414.

Tschalar, Ronald et al., "NTLM Authentication Scheme for HTTP", Jun. 17, 2003, http://www.innovation.ch/personal/ronald/ntlm.html, pp. 1-5, downloaded Jan. 20, 2009.

"Kerberos: The Network Authentication Protocol", http://web.mit.edu/Kerberos/, pp. 1-3, downloaded Jan. 20, 2009.

"Microsoft NTLM", http://msdn.microsoft.com/en-us/library/aa378749.aspx, pp. 1-2, downloaded Jan. 20, 2009.

"NTLM", http://en.wikipedia.org/wiki/NTLM, pp. 1-5, downloaded Jan. 20, 2009.

"Kerberos (protocol)", http://en.wikipedia.org/wiki/Kerberos_(protocol), pp. 1-5, downloaded Jan. 20, 2009.

"The Industry Insiders", http://blogs.technet.com/industry_insiders/articles/407751.aspx, downloaded Jan. 20, 2009.

Christensen, Jesper M, "Kerberos in a Sharepoint Environment", Jul. 30, 2008, http://www.windowsecurity.com/articles/Kerberos-Sharepoint-Environment.html, pp. 1-13, downloaded Jan. 20, 2009.

"The NTLM Authentication Protocol and Security Support Provider", http://davenport.sourceforge.net//ntlm.html, pp. 1-93, downloaded Jan. 21, 2009.

"Integrated Windows Authentication (IIS 6.0)", http://microsoft.com/technet/prodtechnol/WindowsServer2003/Library/IIS/523ae943-5e6a-4200-9103-9808baa00157.mspx?mfr=true, pp. 1-2, downloaded Jan. 21, 2009.

* cited by examiner

FIG. 16  Connection Process 1600

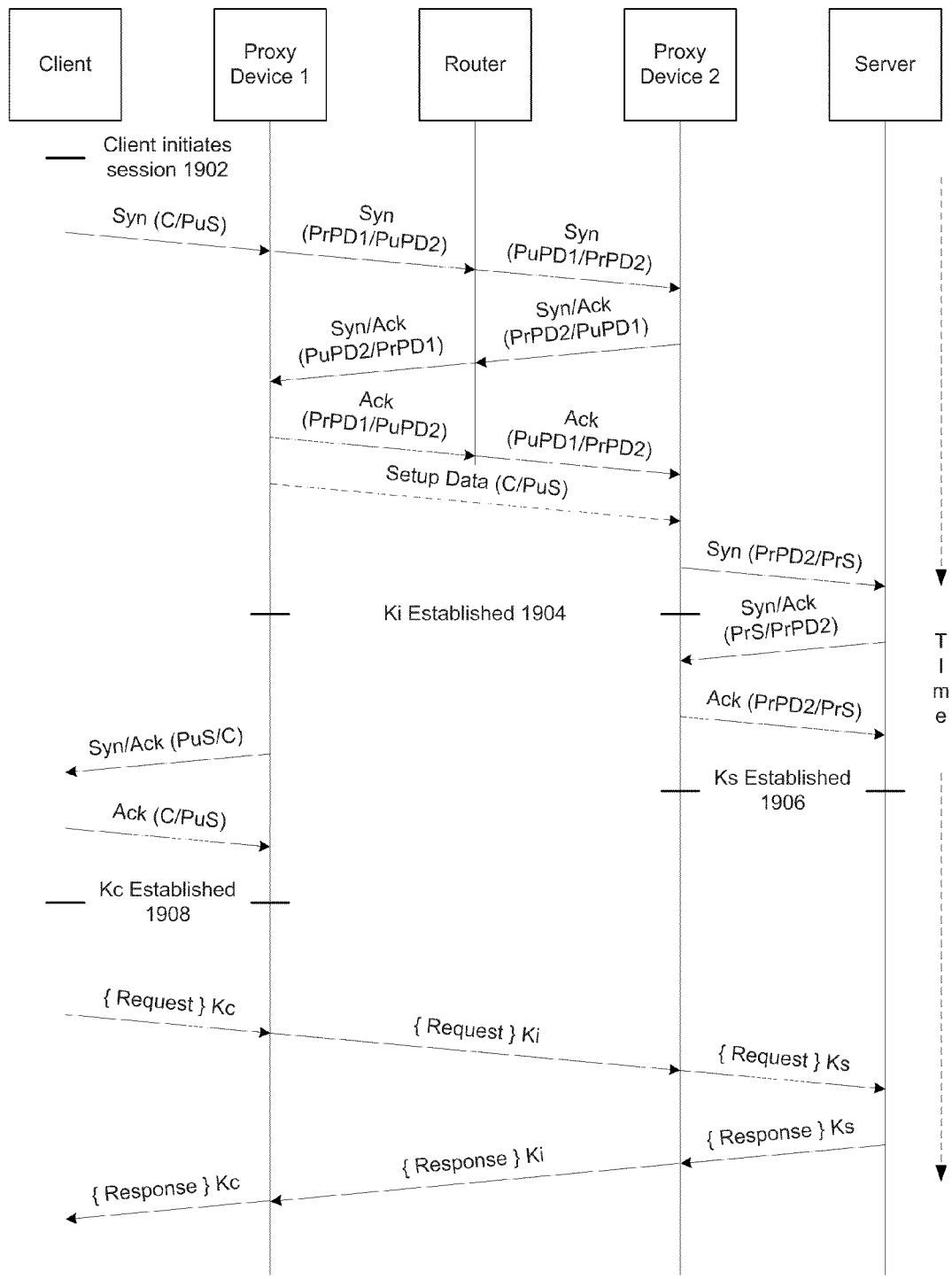
FIG. 19A   Connection Process 1900

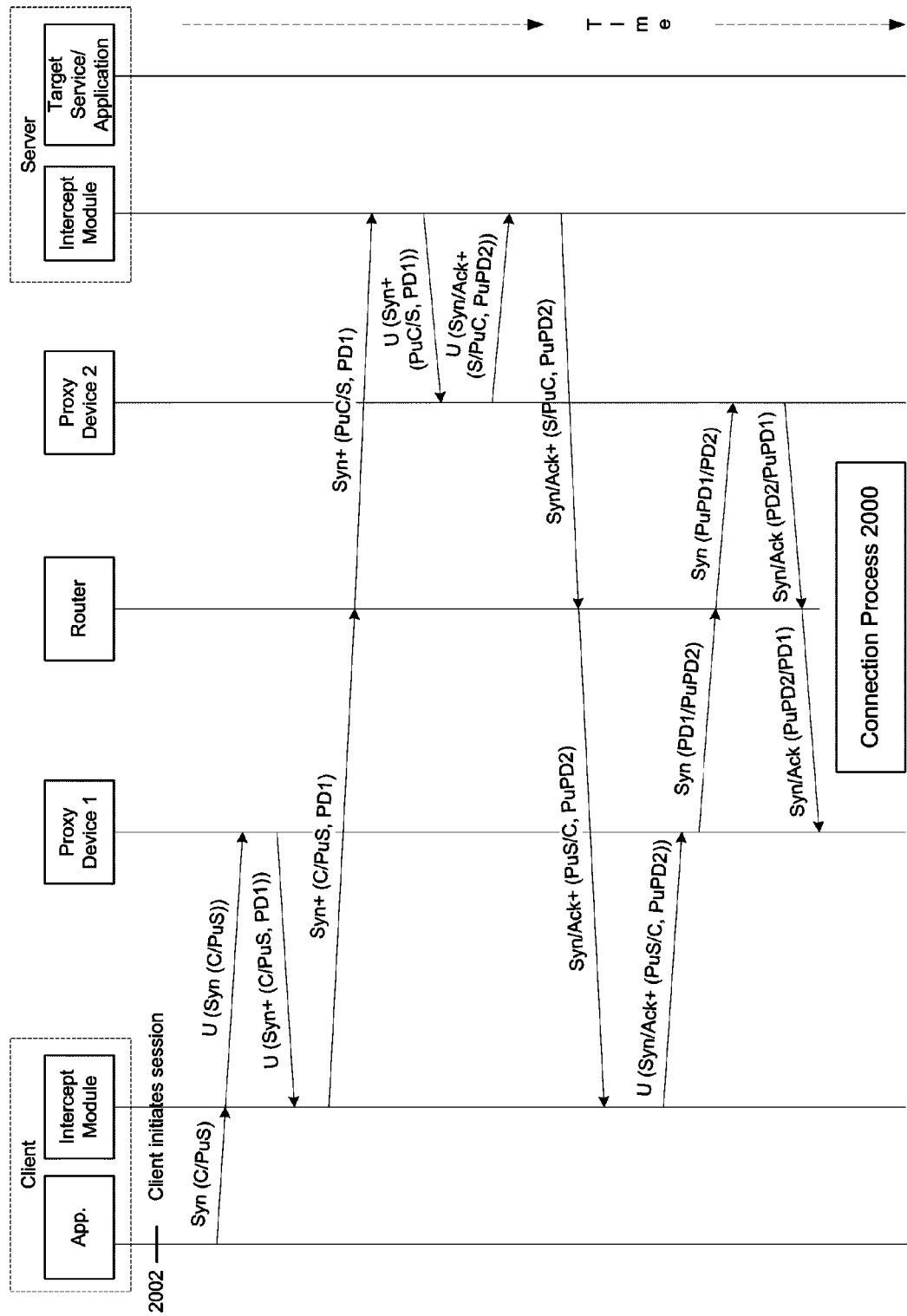

INTERCEPTION OF A CLOUD-BASED COMMUNICATION CONNECTION

RELATED APPLICATIONS

The present application is a continuation-in-part of U.S. patent application Ser. No. 10/640,405, entitled "Transparent Client-Server Transaction Accelerator" (hereinafter "McCanne III"), filed on Aug. 12, 2003, incorporating by reference U.S. patent application Ser. No. 10/640,562, entitled "Cooperative Proxy Auto-Discovery and Connection Interception" (hereinafter "McCanne IV"), filed on Aug. 12, 2003 (now U.S. Pat. No. 7,318,100). U.S. patent application Ser. No. 10/640,405 claims priority to U.S. Provisional Patent Application No. 60/462,990, filed on Apr. 14, 2003. All of the above U.S. patent applications or U.S. patents are incorporated by reference herein for all purposes.

The present disclosure is related to the following commonly assigned U.S. patent applications or U.S. patents, which are each incorporated by reference herein for all purposes:

U.S. patent application Ser. No. 10/285,315, entitled "Transaction Accelerator for Client-Server Communication Systems" (hereinafter "McCanne I"), filed on Oct. 30, 2002, now U.S. Pat. No. 7,120,666 B2 issued Oct. 10, 2006;

U.S. patent application Ser. No. 10/285,330, entitled "Content-Based Segmentation Scheme for Data Compression in Storage and Transmission Including Hierarchical Segment Representation" (hereinafter "McCanne II"), filed on Oct. 30, 2002, now U.S. Pat. No. 6,667,700 issued Dec. 23, 2003.

BACKGROUND

A network is typically used for data transport among devices at network nodes distributed over the network. Some networks are considered "local area networks" (LANs), and others are considered "wide area networks" (WANs), although not all networks are so categorized and others might have characteristics of both LANs and WANs. Often, a LAN comprises nodes that are all controlled by a single organization and connected over dedicated, relatively reliable and physically short connections. An example might be a network in an office building for one company or division. By contrast, often a WAN comprises nodes over which many different organization's data flow, and might involve physically long connections. In one example, a LAN might be coupled to a global internet work of networks referred to as the "Internet" such that traffic from one node on the LAN passes through the Internet to a remote LAN and then to a node on that remote LAN.

Data transport is often organized into "transactions", wherein a device at one network node initiates a request for data from another device at another network node and the first device receives the data in a response from the other device. By convention, the initiator of a transaction is referred to herein as the "client" and the responder to the request from the client is referred to herein as the "server".

Notably, in some instances, what is normally thought of as the client is in fact the server, as with the example of a window system referred to as "X". In some instances, a device, program, or other computing entity can be a client for some transactions and a server for others. For example, suppose device A and device B are coupled by a network and device A makes a request for data of device B. For that transaction, device A is the client and device B is the server. Now, if device B only responds to authorized requests, device B might make a request of device A for authentication data. Thus, for the authentication transaction, device B would be the client and device A would be the server, the reverse of the roles for the data request transaction.

As explained above, a transaction over a network involves bidirectional communication between two computing entities, where one entity is the client and initiates a transaction by opening a network channel to another entity (the server). Typically, the client sends a request or set of requests via a set of networking protocols over that network channel, and the request or requests are processed by the server, which returns responses. Many protocols are connection-based, whereby the two cooperating entities (sometimes known as "hosts") negotiate a communication session to begin the information exchange.

In setting up a communication session, the client and the server might each maintain state information for the session, which may include information about the capabilities of each other. At some level, the session forms what is logically (or physically, in some cases) considered a "connection" between the client and server. Once the connection is established, communication between the client and server can proceed using state from the session establishment and other information and send messages between the client and the server, wherein a message is a data set comprising a plurality of bits in a sequence, possibly packaged as one or more packets according to an underlying network protocol. Typically, once the client and the server agree that the session is over, each side disposes of the state information for that transaction, other than possibly saving log information.

To realize a networking transaction, computing hosts make use of a set of networking protocols for exchanging information between the two computing hosts. Many networking protocols have been designed and deployed, with varying characteristics and capabilities. The Internet Protocol (IP), Transmission Control Protocol (TCP), and User Datagram Protocol (UDP) are three examples of protocols that are in common use today. Various other networking protocols might also be used.

Since protocols evolve over time, a common design goal is to allow for future modifications and enhancements of the protocol to be deployed in some entities, while still allowing those entities to interoperate with hosts that are not enabled to handle the new modifications. One simple approach to accomplishing interoperability is a protocol version negotiation. In an example of a protocol version negotiation, one entity informs the other entity of the capabilities that the first entity embodies. The other entity can respond with the capabilities that the other entity embodies. Through this negotiation, each side can be made aware of the capabilities of the other, and the channel communication can proceed with this shared knowledge. To be effective, this method must ensure that if one entity advertises a capability that the other entity does not understand, the second entity should still be able to handle the connection. This method is used in both the IP and TCP protocols—each provides a mechanism by which a variable length set of options can be conveyed in a message. The specification for each protocol dictates that if one entity does not have support for a given option, it should ignore that option when processing the message. Other protocols may have similar features that allow for messages to contain data that is understood by some receivers of the data but possibly not understood by other receivers of the data, wherein a receiver that does not understand the data will not fail in its task and will typically forward on the not understood data such that another entity in the path will receive that data.

A message from a client to a server, or vice versa, traverses one or more network "paths" connecting the client and server.

A basic path would be a physical cable connecting the two hosts. More typically, a path involves a number of physical communication links and a number of intermediate devices (e.g., routers) that are able to transmit a packet along a path to the server, and transmit the response packets from the server back to the client. These intermediate devices typically do not modify the contents of a data packet; they simply pass the packet on in a correct direction. However, it is possible that a device that is in the network path between a client and a server could modify a data packet along the way. To avoid violating the semantics of the networking protocols, any such modifications should not alter how the packet is eventually processed by the destination host.

While routing protocols generally control how packets are forwarded through a network, sometimes it is desirable to control the forwarding of an individual packet according to rules that override the normal packet routing logic. A common mechanism for accomplishing this is via a set of packet filtering rules. These rules specify characteristics of individual packets and a desired action or actions to take on each individual packet that meets the characteristics. For example, a firewall employs certain packet filters to dictate that some packets should be forwarded, while other packets should be rejected.

Another mechanism that affects the forwarding of an individual packet and overrides the normal packet routing logic is network address translation (NAT). Using NAT, an entity that receives packets modifies the packet's destination and/or source address before passing on the packet. NAT is commonly used at the border between one network of hosts and another network of hosts (or the Internet as a whole).

A router or other such device deployed at the border is configured with a set of rules indicating which packets should have the NAT operation applied, though this may in practice end up being all packets that traverse the device. In this scenario, a set of hosts can be configured with a private range of IP addresses that are not exposed to other hosts in the network—rather the border router rewrites the source address of outgoing packets from the original host's private address to one of a given set of public addresses. This way, the destination server does not need to have routing information to reach the private address, since it perceives all connections as coming from the public address. The router maintains state such that for response packets coming back from the server (addressed to the public destination address), it rewrites the destination and forwards the packet to the original private address, thus routing the packet back to the original client host.

NAT is also used by Layer 4 switch devices ("L4 switches"). An L4 switch is a device that can route all the packets for a particular connection to a destination that differs from the original destination field of each packet in the connection. A common deployment of L4 switches is for use in load balancing. In this type of deployment, a set of servers (each having distinct addresses) is deployed to share the load from client requests such that a connection from a client to a particular server (often called a virtual server) can be routed to and terminated by any server in the set. Rather than rely on the client to choose one of the given servers, an L4 switch is deployed in the network path between the clients and this set of servers. The switch examines the packets and, based on its configuration, uses NAT to forward all packets from a particular client-server connection to a particular server in the set, and conversely, forward all packets from that particular server to the client such that, to the client, the packets appear to come from the virtual server.

Another related concept is that of a network proxy. A network proxy is a transport level or application level entity that functions as a performance enhancing intermediary between the client and the server. In this case, a proxy is the terminus for the client connection and initiates another connection to the server on behalf of the client. Alternatively, the proxy connects to one or more other proxies that in turn connect to the server. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, and so forth.

One problem that must be overcome when deploying proxies is that of directing client requests to the proxy instead of to the destination server. One mechanism for accomplishing this is to configure each client host or process with the network address information of the proxy. This requires that the client application have an explicit proxy capability, whereby the client can be configured to direct requests to the proxy instead of to the server. In addition, this type of deployment requires that all clients must be explicitly configured, which can be an administrative burden on a network administrator.

One way around the problems of explicit proxy configuration is to deploy a transparent proxy. The presence of the transparent proxy is not made explicitly known to the client process, so all client requests proceed along the network path towards the server as they would have if there were no transparent proxy. This might be done by placing the transparent proxy host in the network path between the client and the server. An L4 switch is then employed so the proxy host can intercept client connections and handle the requests via the proxy. For example, the L4 switch could be configured so that all Web connections (i.e., TCP connections on port 80) are routed to a local proxy process. The local proxy process can then perform operations on behalf of the server.

For example, the local proxy process could respond to the request using information from its local cache. When intercepting the connection, the L4 switch performs NAT so the connection appears to the client as having been terminated at the origin server, even though the client communicates directly with the proxy. In this manner, the benefits of a proxy can be realized without the need for explicit client configuration.

Some benefits of a transparent proxy require that a proxy pair exist in the network path. For example, if a proxy is used to transform data in some way, a second proxy preferably untransforms the data. For example, where traffic between a client and a server is to be compressed or encrypted for transport over a portion of the network path between the client and the server, a proxy on one side of that portion would compress or encrypt data before it flows over that portion and a proxy on the other side of that portion would uncompress or decrypt the data and send it along the network path, thereby providing for transparent transformation of data flowing between the client and the server.

For actions that require a proxy pair, preferably both proxies in the proxy pair do not perform a transformation unless they can be assured of the existence and operation of the other proxy in the proxy pair. Where each proxy must be explicitly configured with indications of the pairs to which it belongs and to the identity of the other members of those pairs, the administrative burden on a network administrator might well make some operations infeasible if they require proxy pairs. Even where a proxy is interposed in a network and gets all of the traffic from a client or server, it still must discover the other member for each proxy pair the proxy needs, if the proxy is to perform actions that require proxy pairs.

"Cloud" computing environments embody yet other obstacles to the creation of client-server communication connections that can be managed or optimized by proxy pairs. Cloud computing enables on-demand access to shared computing resources (e.g., networks, servers, storage, applications, services) that can be readily provisioned with relatively little effort. Such resources are typically virtual and thus abstracted from the underlying physical resources (e.g., communication links, computers, storage devices).

Management or operation of a cloud-based network environment may be shared between three or more entities, including an operator of the physical server resources that are being shared, a customer or client that wishes to use virtual server resources to provide a network-based application or service, and an entity that is engaged to optimize or otherwise process client connections with the application or service.

Configuration of the physical server resources remains under the control of the operator or provider of those resources. Although the operator's customer is able to configure the applications or services it provides via the resources, typically the underlying physical communication (i.e., network) topology is controlled by the provider of the physical resources.

Because the entity charged with optimizing or processing client-server connections cannot configure network-related aspects of the client and/or the server (e.g., network addresses), it may be unable to effectively operate a proxy (or multiple proxies) for the purpose of obtaining and transforming the client-server communications.

In particular, the entity attempting to optimize or process the client-server communication connection may not be able to place its proxy or other network device so as to receive or intercept all communication traffic between a client and the physical server. The entity also may not be able to configure or reconfigure a NAT device that operates on the client and/or the server, or in another location along the network path between the client and the server.

Therefore, improved techniques for handling data over networks are needed.

SUMMARY

In some embodiments of the invention, methods and apparatus are provided for intercepting a client-server communication connection by an entity (or pair of entities) that are not in direct paths of communication between the client and a cloud-based server. In these embodiments, the entity (or an operator of the entity) cannot configure network addresses of the client and/or the server, and, because of a lack of control over the communication topology, cannot install a device (e.g., a router, an L4 switch, a proxy) in a path of all communications between the client and the server.

In some embodiments of the invention, the server is configured with an interception module for detecting a request for the client-server connection and redirecting the request to a server proxy device. The server proxy device establishes a portion of the client-server connection on behalf of the server, while a client proxy device establishes another portion of the connection. A final portion of the connection is established between the two proxy devices.

Other features and advantages of the invention will be apparent in view of the following detailed description and preferred embodiments.

BRIEF DESCRIPTION OF THE DRAWINGS

FIGS. 19A-D are timing diagrams describing illustrative processes for intercepting a communication connection between a client and a cloud-based server, according to some embodiments of the invention.

FIGS. 20A-B comprise a timing diagram describing another process for intercepting a communication connection between a cloud-based client and a cloud-based server, according to some embodiments of the invention.

DETAILED DESCRIPTION OF ILLUSTRATIVE EMBODIMENTS

Figure 1:
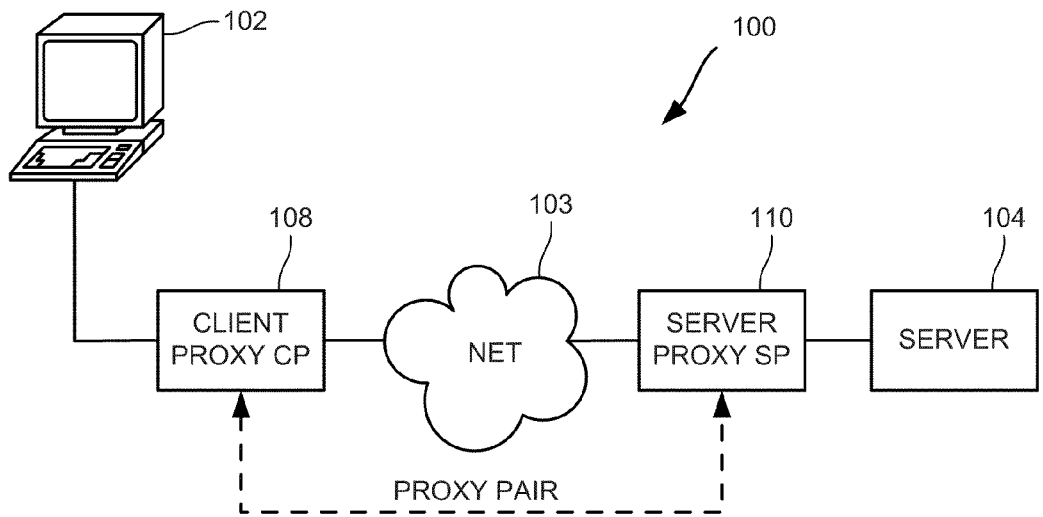
FIG. 1 is a block diagram of a networked system where a client-side proxy and a server-side proxy are interposed in a network path between a client and a server.

The present invention has many applications, as will be apparent after reading this disclosure. In describing an embodiment of a networked content delivery system according to the present invention, only a few of the possible variations are described. Other applications and variations will be apparent to one of ordinary skill in the art, so the invention should not be construed as narrowly as the examples, but rather in accordance with the appended claims.

A general problem when deploying multiple network entities in a cooperative scenario, in which the entities must coordinate and interact with one another, is that of configuration. This problem is especially acute when trying to deploy cooperative transparent proxy functionality that depends on several cooperating network entities, such as where network traffic between a client and a server is to be intercepted by one proxy that in turn communicates with one or more other proxies to process the network traffic.

In general, the proxies may modify or otherwise process the client-server traffic using techniques that are incompatible with the original client-server protocol and thus require a proxy at some point to process the data back into a form that is compatible with the original client-server protocol. The conversion of the data back into the compatible form could be a conversion identical to what was converted, but need not be identical so long as protocol requirements are met.

Devices such as L4 switches can intercept network traffic without explicit client and/or server configuration, but that approach cannot accommodate proxy pairs. In a proxy pair, an intercepting device pairs with another intercepting device, such that the first device transforms the data and the second device untransforms the data to reconstitute exactly what the first device received, or to generate data that is not exactly what the first device received but is in conformance with an operative protocol.

For example, transformation might include the removal of extraneous data and further transformation, while the untransformation does not add back the extraneous data but does an inverse of the further transformation. In such a scenario, a given proxy must still be aware of the existence and network address information of the other cooperating proxies. For example, in a system where two proxies are performing a transport layer compression operation such as the segment cloning described in McCanne I, the two proxies that form a proxy pair need to be aware that there is a corresponding proxy also in the network path to facilitate the compression operation.

As used herein, "proxy pairing" is a process of associating two proxies. The two proxies are members of a proxy pair, and each member of a proxy pair is aware of the other member of the proxy pair and knows its address (or other identifier). A given proxy can be a member of more than one proxy pair. Where a given proxy is a member of a plurality of proxy pairs, the other members of those proxy pairs can be distinct or can be duplicative, (i.e., there might be more than one proxy pair that has the same two members). In some cases, a proxy pair might be generalized to a "proxy grouping" of more than two proxies for purposes equivalent to what a proxy pair might do.

Generally, a proxy pair exists in relation to one or more transactions or communication connections. Thus, proxy A and proxy B might be paired for some transactions and not others. Often, two proxies are paired for all transactions between pairs of particular clients and particular servers. In most instances, a proxy pair comprises a client-side proxy ("CP") and a server-side proxy ("SP") and each member of the proxy pair is aware of which side (client or server) they are on.

The proxies in a proxy pair can become aware of the pair and the other member (and which side they are on) by being explicitly configured as a proxy in a proxy pair. Alternatively, the proxies can gain awareness through information provided by a client or a server (which typically requires an appropriately configured client or server), or the proxies can automatically discover possible proxy pairs using techniques described herein. Naturally, if proxies can discover proxy pairs of which they are members without any assistance from a client, a server or a network configurator, in a way that such discovery can be transparent to clients and servers, operation and maintenance of a proxy pairing system is greatly simplified.

Once the proxies in a proxy pair are aware of the pairing and the other member, the pair can intercept network transactions. Once intercepted, the proxies are able to implement performance-enhancing optimizations to both the transport protocol and the application data payloads in a transparent fashion, and thus remain backward-compatible with existing deployments of clients and servers. With the pairing, the optimizations need not conform to the end-to-end network protocol, as each proxy can undo nonconforming operations of the other proxy.

Connection interception can be done by a number of different devices, which might involve hardware, software, or both. Interception can be done with a computer, computing device, peripheral, electronics, or the like, and/or using an application being executed or controlled by such an element. The interception mechanism can be integrated into a network device such as a router or a bridge, such that some of the traffic that flows through the device is altered by the interception mechanism. The interception mechanism may alternatively be integrated into the client and/or the server itself. Thus, when describing herein a client-side proxy and/or server-side proxy, those terms need not necessarily refer to separate physical hosts or computing entities, but may be logical entities that are part of the client, the server, and/or any other routers, hosts or other devices along a network path between the client and server.

The general term "proxy device" is used to refer to a proxy that could be a client-side proxy, a server-side proxy, or both (client-side proxy for some pairs/transactions, server-side proxy for other pairs/transactions). The CP (client-side proxy or client-proxy) functionality described herein and the SP (server-side proxy or server-proxy) functionality described herein can exist in one proxy device, such that the proxy device functions as both an SP and a CP, simultaneously, for different client-server connections.

It should be understood that while clients, servers and proxy devices are shown herein in various places as standalone boxes, clients, servers and proxies can be implemented as discrete hardware elements, software elements running on a programmable computing element (e.g., desktop computer, handheld device, router, switch, embedded logic device), firmware, or some combination, running as distinct elements or integrated with other elements. For example, a router might include software to implement a proxy device ("PD") that might be a CP or an SP for some transactions, with that CP or SP functionality entirely implemented as part of the router.

FIG. 1 illustrates a simple example of a networking configuration wherein a proxy pair is interposed in a network path between a client and a server. As shown there, system 100 can be used for communications between a client 102 and a server 104 across a network 103. In a number of examples, network 103 is a WAN, but this description is not so limited. A proxy pair comprises a client-proxy CP 108 and a server-proxy SP 110. CP 108 is interposed between client 102 and network 103, while SP 110 is interposed between network 103 and server 104.

For the sake of clarity and simplicity, client 102, server 104, CP 108, and SP 110 are shown as separate entities, but that need not be the case. Much of the description below assumes that CP 108 and the SP are "in-path" between client 102 and server 104 such that all network packets sent from client 102 to server 104 pass through CP 108, then SP 110, then reach server 104, and vice versa, but other paths are possible. There may be any number of other hosts and/or network devices (not shown), comprising a routed data network, between client 102 and CP 108 and SP 110 and server 104.

Figure 2:
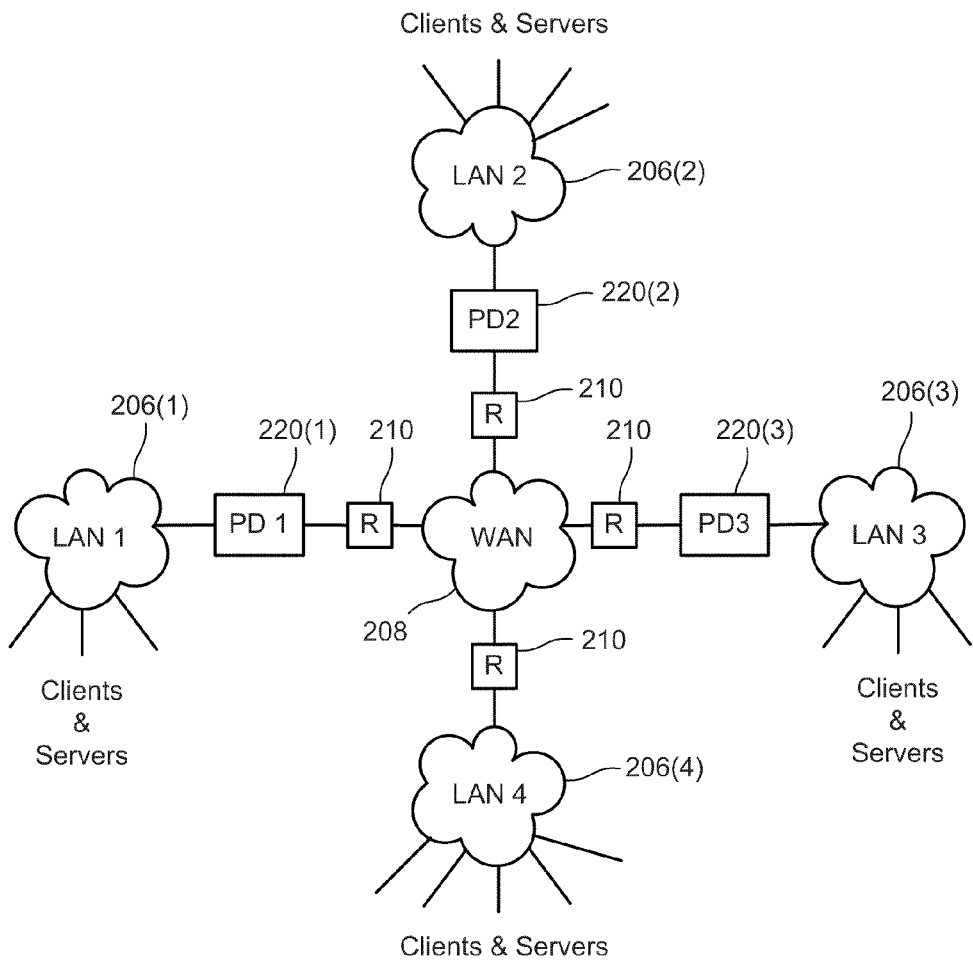
FIG. 2 is a block diagram of a networked system wherein various LANs are coupled to a WAN, some of which include proxy devices and some of which do not.

Later discussion describes elements of relevant systems with respect to the topology of FIG. 1, however other more complex topologies are possible. For example, FIG. 2 shows how multiple devices can be present in a networked environment. Yet other embodiments of the invention are described below for network topologies or environments in which a CP and/or SP cannot be installed "in-path" between a client and a server.

In the topology of FIG. 2, four LANs 206 are coupled in an internet work including a WAN 208, which interfaces to each of the LANs in this example via one of a plurality of routers 210, as might be conventionally used. Some LANs 206 are coupled to their respective routers 210 directly (e.g., LAN 4), while others are coupled via a proxy device PD 220 (e.g., LAN 1, LAN 2, LAN 3). Note that each LAN 206 might support both clients and servers, each of which might use the services of their proxy device and possibly other proxy devices.

As an example of a client-server connection, a client on LAN 1 might initiate a connection to a server on LAN 2. The connection could be proxied through PD 1 and PD 2 to enhance performance. Similarly, a client communicating from LAN 3 to a server on LAN 1 might benefit if the connection were proxied by PD 3 and PD 1. However, if a client on LAN 1 were to communicate with a server on LAN 4, no such paired proxying should occur because there is no proxy device present for LAN 4.

Proxies are preferably able to automatically determine where and when other pairable proxies are present on paths between a client and a server, so that connections are not intercepted at either end unless a proxy pair is present. Preferably, connection interception between pairs of cooperating proxies is transparent to communication between the client and server. Transparency exists when a client can act as if it is communicating directly with the server and the server can act as if it is communicating directly with the client, or when conditions are such that modifications or configuration are not required at the client or the server to accommodate the use of proxy pairs.

The proxy pairs are not limited to a homogeneous enterprise network, and can be used and deployed in configurations where administrative boundaries are traversed. As one advantage, this approach allows auto-discovery of such device relationships without requiring any explicit configuration to interconnect devices in distinct administrative domains.

For example, proxy devices could be placed within the data centers of one or more popular Web sites and within the access networks of one or more Internet service providers. In this way, connections between clients attached to the enabled service provider network and servers within enabled Web sites are intercepted and processed by the SP (in the Web site data center) and the CP (in the access network). Likewise, if two or more enterprises deployed these devices in their network infrastructures, then client-server connections traversing their extranets could be proxied and processed. In both cases, when the client-server connection does not terminate at a proxy-enabled site (or originate from a proxy-enabled site), then the traffic would not be proxied and would not be in any way adversely impacted.

Figure 3:
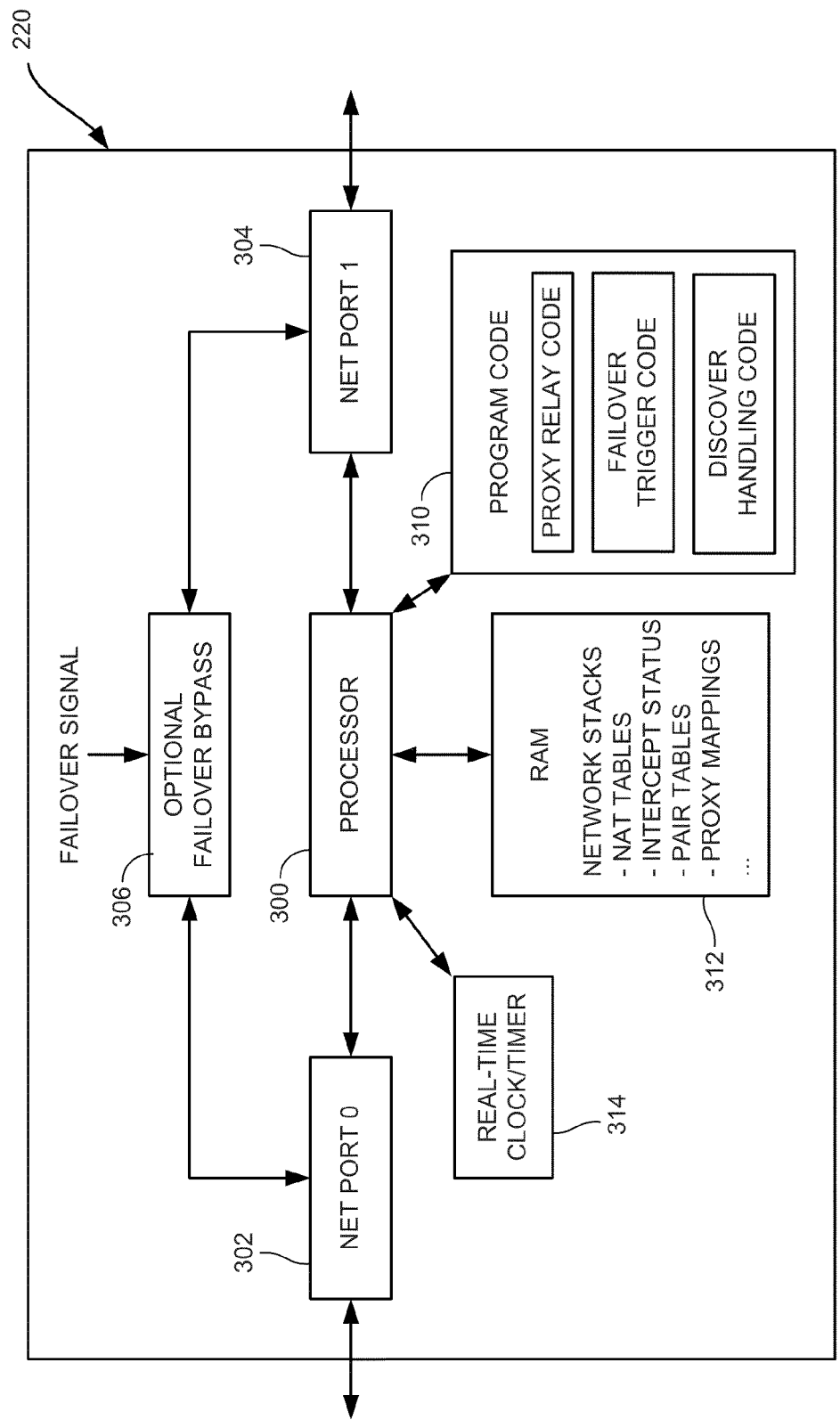
FIG. 3 is a schematic diagram of a proxy device as might be used in the networked systems shown in FIGS. 1-2.

FIG. 3 shows details of one example of a proxy device 220 as might be used in the systems described above. Proxy device 220 is shown comprising a processor 300 that interfaces to the network via network ports 302 (Port 0), 304 (Port 1). Also shown is an optional failover bypass module 306, program code 310 representing various functionality, random access memory ("RAM") 312 for maintaining data structures used by processor 300, and a real-time clock/timer 314.

In a typical operation, proxy device 220 receives a packet at port 0, processor 300 might perform some processing, and the original packet or a modified packet is sent out on port 1. In response to a failover signal, such as a signal indicating that processor 300 is inoperative, optional failover bypass module 306 might receive packets at port 0 and output those packets unchanged at port 1 and receive packets at port 1 and output those packets unchanged at port 0.

Failover bypass module 306 might comprise a dual port Ethernet NIC with a failover capability. The NIC allows proxy device 220 to be inserted into the path of a 100 BaseT or GigE connection, for example, and act as a transparent Ethernet relay. The proxy device can be inserted into the path between a WAN router and a LAN switch simply by unplugging the router from the switch, plugging it into one of the proxy device ports (e.g., port 0, port 1) and plugging the other NIC port into the LAN switch. In normal operation, traffic that is not intercepted by a proxy module would be simply forwarded out the adjacent interface by a kernel interrupt handler, much like an Ethernet bridge. Traffic that is processed locally is intercepted by proxy device kernel module and delivered to a local proxy handling process running in user space.

One potential limitation of this approach is that the device is now in the critical path of the network and represents a single point of failure. To address this issue, the dual port NIC includes a failover mechanism that allows the NIC to automatically bypass the host under exceptional conditions. In particular, the NIC might include a physical bypass circuit built from mechanical relay switches that can short-circuit the two ports into a cross-over configuration in the absence of a signal (such as a heartbeat signal) indicating that the device is operative to process data. In normal operation, the relays are engaged and packets are processed by the host. If such packets are part of an optimized connection, they are diverted to the engine process on the local host. Packets that arrive at the host but are not part of an optimized connection are simply relayed across the NIC to the adjacent port.

However, when an exceptional condition arises (software crashes, power fails, etc.), the relays become disengaged. As a result, the two Ethernet cables that are plugged into the NIC become physically interconnected in a cross-over configuration. A software crash is detected by the NIC using a hardware watchdog circuit on the board. If the watchdog circuit is not reset every second or so by the system software (i.e., because the software fails or the operating system crashes), then the NIC disengages the relays, which bypasses the device even if the power remains on.

Given the proxy device's in-path vantage point, it is able to transparently intercept any traffic that it desires. Toward this end, an operator configures the device with the TCP/UDP port numbers and/or application types that are to be intercepted and optimized. All traffic types that are not so configured are simply passed through the device unmodified. Connections that correspond to traffic types that are configured for interception are processed by elements that terminate the transport connection locally and process the client-server protocol messages using techniques described herein or their equivalent. Support for each application/protocol type can be thought of as a "software blade" that is installed in the proxy device.

Figure 4:
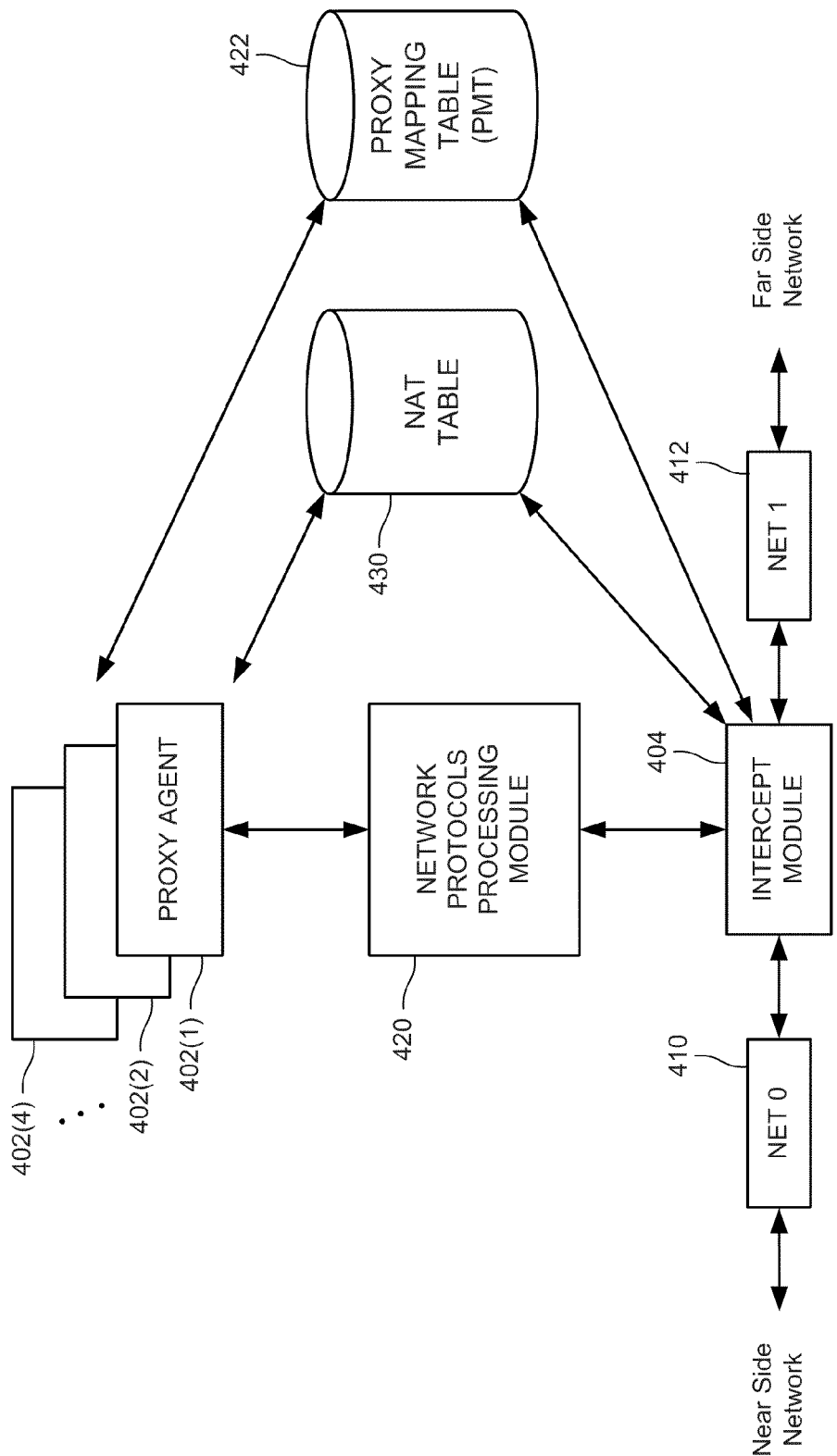
FIG. 4 is a schematic diagram of the proxy device shown in FIG. 3, in terms of modules and storage components.

FIG. 4 is a schematic diagram of proxy device 220 shown in terms of modules and storage components. In a typical embodiment, the modules and agents might be implemented using code from program code 310 and storage components might be implemented as data structures in RAM 312. In the example shown, proxy device 220 functions as a Layer 2 relay. FIG. 4 shows a set of proxy agents 402, an intercept module 404, a network protocols processing module 420, and network interface ports 410, 412. Optional failover components might be present, but are not shown in the figure. Among the data storage structures illustrated, a proxy mapping table (PMT) 422 and a network address translation (NAT) table 430 are shown. Network protocols processing module 420 implements the end host versions of traditional network and transport protocols like IP, TCP, UDP and so forth.

The two network interfaces 410, 412 cooperate through the intercept module. Intercept module 404 performs an operation akin to that of a two-port bridge—packets that arrive on one interface are forwarded out the other interface. Unlike many bridge devices, however, proxy device 220 is configured with a network address, and therefore has a presence on the network and can be communicated with directly. Network interfaces 410 and 412, on the other hand, are not assigned network level addresses but, as usual, are assigned link level addresses for sending and receiving packets over the attached LAN.

When a packet arrives on either of the two network interfaces, if the packet is addressed to the proxy device 220 (i.e., the address assigned to proxy device 220 is the same as the destination address of the arriving packet) then intercept module 404 directs the packet to the network protocols processing module 420. Packets that originate from within a process or module inside proxy device 220 are transmitted out one or both of the network interfaces. In addition, intercept module 404 may alter the normal packet processing to cause traffic to be intercepted and delivered to a local proxy agent when, in fact, the traffic was originally addressed to some other end host.

A proxy agent 402 is instantiated as the terminus point for the client and server connections that are intercepted by proxy device 220. Alternatively, one global proxy agent might handle all proxy agent functions regardless of the number of connections handled. While exceptions might be possible, it is expected that one proxy agent would be instantiated for each proxy pair of which proxy device 220 is a member and that there is a one-to-one correspondence between proxy pairs and connections handled.

Intercept module 404 includes logic to divert some network traffic to one of the proxy agents, which may in turn make additional network connections to other hosts to handle the network traffic. Intercept module 404 may also modify packets and forward those packets out of the host, as described below. Intercept module 404 also manages and utilizes NAT table 430, which contains network address translation rules that are used to modify packets accordingly.

When a proxy agent makes additional network connections to other hosts or other proxy devices, it may consult PMT 422, which maps server addresses to one or more nearby proxy addresses. This allows the proxy agent 402 to determine the server-side proxy to communicate with for the client-server session that it processes. A proxy agent 402 might also consult NAT table 430 to determine the original destination or source address of packets (or of the connection end-points that carry the packets) if they had been rewritten.

The entries in PMT 422 could be manually populated by an operator using explicit knowledge of the deployment. However, while such manual configuration provides a great deal of flexibility, it also burdens the operator not only with a fairly complicated setup process, but also requires constant maintenance of these tables as the server and network infrastructure evolve. A better approach is to automatically discover the mapping as described herein. Performing such automatic discovery can be done without introducing any extra connection setup delay (for both intercepted as well as non-intercepted traffic). Thus, the entries in PMT 422 may be populated by intercept module 404 using methods described later.

In some embodiments, a proxy device is realized from a general-purpose computer running a standard operating system such as Linux™ or Microsoft Windows® with extensions. As a standard computing host, the proxy device's operating system kernel might implement a standard network stack, with intercept module 404 added as extensions to the kernel environment. The proxy agents might run as user processes, with intercept module 404 using techniques described herein to divert client and/or server connections to a proxy process.

Figure 5:
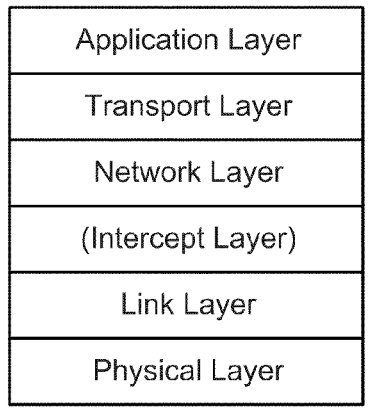
FIG. 5 is a layer diagram illustrating a position of an intercept layer.

FIG. 5 is a layer diagram illustrating a position of an intercept layer in a network stack that could be implemented in the client and server end hosts. In this case, the only packets that are processed by the host are those that are addressed to it. This particular example shows the intercept module as a part of the network stack integrated between the link layer and the network layer. Thus, much as in the deployment described in FIG. 4, the intercept module has the opportunity to examine and potentially modify packets before they are processed by the network layer. This deployment scenario assumes that the client and/or the server would be configured with whatever functionality a proxy would be performing. As such, the proxy agent is not a separate process but is shown as a part of the client-server process running as an application on the host. Furthermore, the end host implementation could be combined with the network device implementation in a hybrid configuration.

Probe Query

Figure 6:
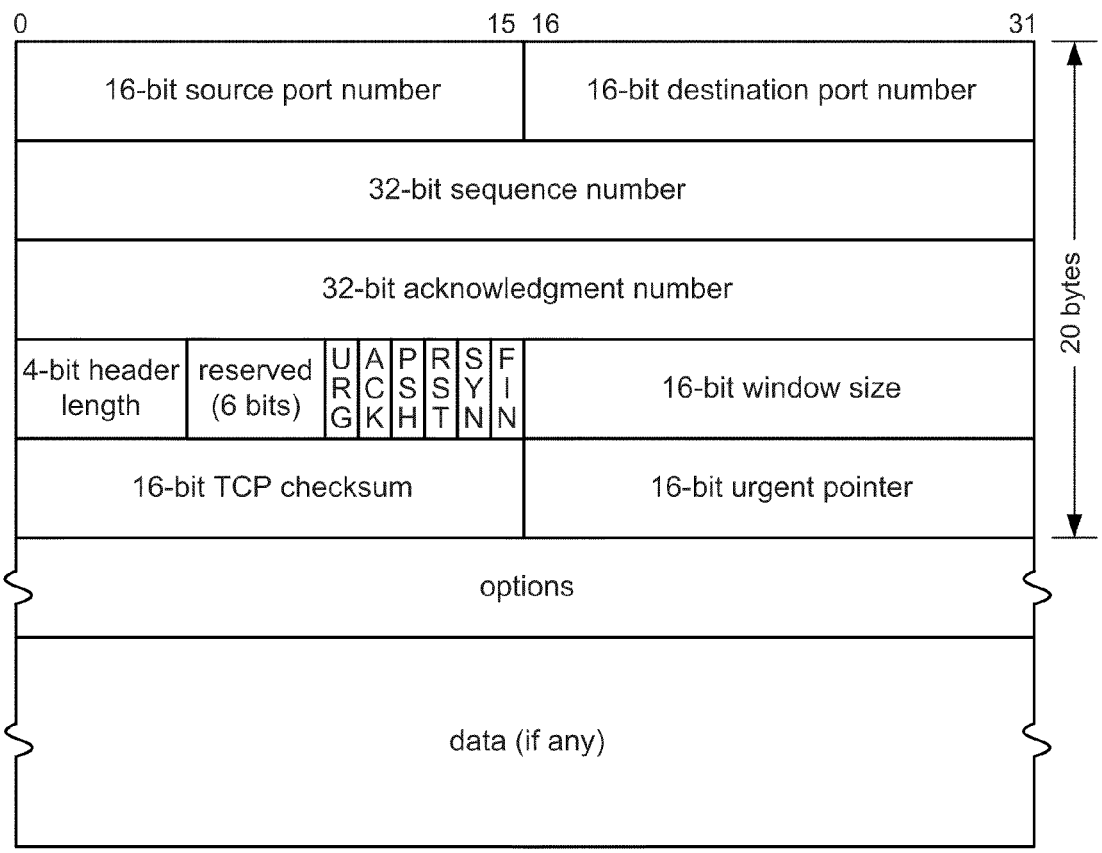
FIG. 6 is a schematic diagram of a packet including optional fields for signaling, and proxy devices.

FIG. 6 is a schematic diagram of a packet including optional fields for signaling, and proxy devices as might be used for probe queries and probe responses. Probe queries as described herein are one method or apparatus for signaling the presence of a proxy to other proxies. Probe responses as described herein are one method or apparatus for return proxy signaling in response to proxy signaling.

As shown in FIG. 4, a proxy device includes two network ports (and might have more ports not shown in FIG. 4). For a transaction, one network port is associated with a client direction while the other network port is associated with a server direction. The proxy device treats the first network port as the source of packets from the client and treats the second network port as the source of packets from the server. For sending packets towards the client, the proxy device uses the first network port and for sending packets towards the server, the proxy device uses the second network port.

While a particular network port might be oriented toward a client for one transaction and oriented toward a server for another transaction, the term "client port" used with reference to a particular connection or transaction refers to whichever port is being used to interface, directly or indirectly, towards the client, and the term "server port" refers to the other port that is being used to interface, directly or indirectly, towards the server. Also, when and if the proxy device does not know the port that is toward the client or toward the server, it may send a copy of the packet through both ports.

Upon receipt of a packet from the client port where the proxy device is a CP for the transaction associated with the received packet, the intercept module determines what actions to take on the received packet. If the PMT does not have an entry for a destination server associated with the destination found in the received packet, the intercept module attempts to learn whether or not a corresponding SP exists on the network path and, if so, its network address.

To detect and identify an SP, the CP's intercept module constructs a probe query packet and transmits that packet towards the server. The CP can then determine, based on the events that occur after sending the probe query packet, whether or not there is an SP on the network path. Likewise, even if the PMT has a mapping for a particular destination server available and a connection request for that server is received from the client, the CP intercept module may optionally generate a probe query packet to refresh the mapping. Optionally, as described later herein, the intercept module may decide to handle the connection in other ways, rather than probe for a server side proxy, based on user configuration.

In preferred implementations in particular networks, the CP constructs a probe query packet by adding a probe query option to the network or transport layer options portion of the connection request packet as illustrated in FIG. 6. This allows optional messages to be piggybacked on an existing packet. Often, these optional messages are simply called "options". The CP makes use of options data by attaching a new option to the list of options that is already present in the packet, thereby advertising its own existence on behalf of the client. The option code is an assigned number that uniquely identifies the option as being a probe query. The CP may store some state in the PMT indicating that a probe has been sent for the given server.

After appending the option code, the probe query packet is forwarded along the network path towards the server by the normal network delivery process. If an SP exists along this path, it detects the presence of a probe query option in the packet. The detecting SP then transmits a probe response back towards the client, expecting that this probe response will be detected by the CP. By sending this probe response, the SP informs the CP of its own existence, including related contact information (e.g., network address, transport port).

In addition, after sending the probe response, the SP might not forward the connection request packet towards the server, and may instead deal with it locally. Because the SP knows that a proxy pair can be formed with it and the signaling CP, the SP expects that the CP, upon receiving the probe response packet, will intercept and proxy the connection. With the CP proxying the connection, the client's connection request packet should not be forwarded to the server, which would respond by establishing a connection with the client. Instead, the SP will establish a connection to the server as needed.

One advantage to using probe queries and responses is that if there is no SP on the path between the CP and the server, the modified connection request packet (i.e., the original packet with the appended probe query option) is received by the server host. And, according to the network and transport protocol specifications, unrecognized options are ignored. Thus, when a server receives a modified connection request from a client, the probe query option is ignored and a connection response packet is sent to the client, establishing a network session with the client exactly as if no probe option were present in the connection request. Additionally, when the server sends a connection response packet along the network path towards the client, the response passes through the CP. The CP can thereby implicitly detect that there is no SP on the path towards that particular server and can act accordingly. For example, the CP can just forward traffic or take other actions that do not require a proxy pair, or other actions as described herein.

Other embodiments of the probe query mechanism may be realized as well. When the CP intercepts a connection request packet, instead of modifying the packet and appending a new option code, it could stall the packet and instead send a probe query packet of any form towards the server. For example, this alternative probe query could simply be a new TCP connection request packet on a well known port that is intercepted by all SP agents. The CP then waits for a certain amount of time, expecting to receive an acknowledgment of whether or not there is an SP in the transport path towards the server. If an SP responds to this connection request, the CP knows that it can intercept the connection, and as such, forwards the stalled connection request packet to the NAT system and then to the local agent process. If the CP receives a negative acknowledgement, or does not receive an acknowledgment within a certain time period, it concludes that there is no SP in the path, and the stalled connection request packet is forwarded to the server unmodified.

In another embodiment, the CP sends the original connection request in parallel with a new query packet. This has the benefit that no connection requests are ever delayed as a result of the probing operation, yet also means that a connection request may pass through two proxies without being intercepted. However, the results of the probe query process could be used for future connection requests, so that only the first connection attempt ends up being passed through unmodified.

Probe Response

As described above, if there is an SP in the path from the client to the server, that SP should intercept probe query packets coming from the CP and send a probe response of some form, indicating to the CP its own existence and providing contact information. In some embodiments, the probe response packet is constructed as a modified connection response packet that corresponds to the modified connection request packet. The SP also makes use of the options portion of the packet header, adding a probe response option conveying its network address and transport port information in the option data.

Because the probe response packet is a simulated connection response packet, it is sent on the network with a source address corresponding to the server and a destination address corresponding to the client. The packet is then sent on the reverse path (i.e., towards the client) in lieu of sending the connection request to the server. Assuming the network paths are symmetric, the client-side proxy detects this response packet and acts on it. In other embodiments, the probe response is a special response packet sent from the SP to the CP communicating the SP's contact information as well as whatever other information might be helpful in allowing the proxies to coordinate and cooperate with one another. For example, the SP may include a list of addresses of other candidate server-side proxy devices to clustering and/or load balancing, as described later.

The CP acts on a response packet by updating the PMT with a new map entry indicating that for the given destination server (and possibly port), there is an SP in the path. Illustratively, the SP contact information may be extracted from the probe response and inserted in a mapping entry. In addition, the CP installs an entry in the NAT table that rewrites the IP destination address with the local proxy IP address for all packets corresponding to the client-server session in question.

When receiving a probe response packet, the CP may reconstruct the original connection request packet from the probe response packet, which was derived from the probe query packet. Then, because a NAT table entry now exists for the client-server connection in question, the original connection request is then forwarded to the local proxy agent. As described below in more detail, the CP communicates with the SP to establish a proxied connection between the client and the server, making use of NAT tables to operate transparently.

If the CP observes a connection response coming from the server without an SP signaling for a connection that the CP signaled towards the server, the CP can conclude that there is no SP in the path. Alternatively, other implicit tests might be employed, such as relying on a timer, waiting for a future connection request from the same client, or other techniques. However, if the CP concludes that a SP is not present, or a previously detected SP is no longer present, the CP updates its PMT with this new information by installing a map entry for the destination server indicating the absence of a proxy (e.g., by setting the entry to "no-proxy").

The mapping entries that are dynamically added to the PMT may become inaccurate over time. For example, a route in the underlying network might change so that the SP on a path for a particular server S may no longer be present on that path. Likewise, a CP could be installed and enabled before a corresponding SP is installed. Even after the SP is installed, the CP may erroneously assume the SP is not present because of a relevant "no-proxy" entry in the PMT. To handle this consistency problem, some embodiments of proxy devices occasionally refresh map entries in the PMT (e.g., according to a timer).

Logically, each map entry might have a refresh timer associated with it. When the timer expires, a probe is proactively sent toward the server in question to determine if the corresponding SP is still present on the path (or if a different SP happens to become present). Alternatively, the mapping entry could be simply removed from the PMT; a subsequent connection request would simply result in transmission of a new probe. This timer-based approach could be optionally complemented with a connection-driven approach. With a connection-driven approach, each time a connection request is processed, a probe is proactively sent toward the server in question to determine if the corresponding SP is still present on the path.

Actions Taken by an Intercept Module

Figure 7:
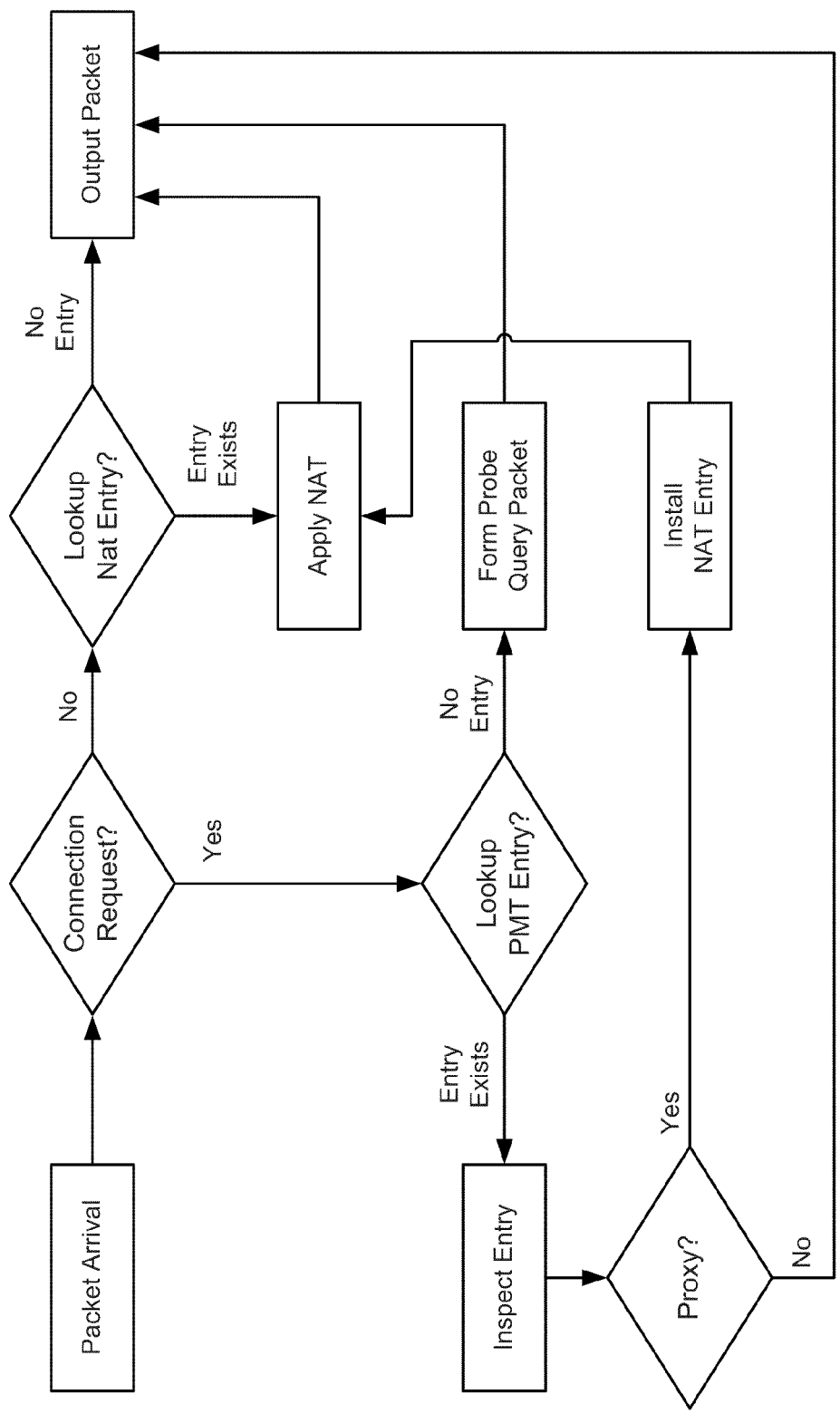
FIG. 7 is a flowchart illustrating actions taken by an intercept module when a packet passes through a proxy device.

FIG. 7 is a flowchart illustrating actions taken by an intercept module when a packet passes through a proxy device. The flowchart elements correspond to major components of an intercept module and the various operations and decisions that are made as a packet traverses through the intercept module. The description immediately below is generally from the point of view of a client-side proxy. The actions of the server-side proxy are described further below. This flowchart is merely illustrative, as the functionality embodied herein can be accomplished by variations in these steps whereby such steps might be reordered, processed by different modules, and so forth.

In general, when a packet arrives on one of the proxy device's interfaces, the intercept module examines the packet to determine if it is destined for the local host (i.e., whether it is addressed to the local proxy device or is a broadcast or multicast packet). If so, the intercept module passes the packet to the local network stack. Otherwise, the intercept module examines the packet to determine if it is a connection request packet. The exact semantics of what determines a connection request packet depend on the network and application protocols that are being proxied.

For example, in TCP, a connection request is noted by the presence of the "SYN" bit in the flags field of the TCP protocol header. Other applications may use a protocol such as UDP, which does not define specific connection semantics. In this case, the first packet of a UDP flow can heuristically define the start of a connection, where a UDP flow may be defined as all packets with a common source network address, destination network address, source UDP port, and destination UDP port. Likewise, the end of a connection can be implied by the absence of packets from a flow for a certain amount of time.

For connection request packets, the intercept module determines whether and through where the connection should be proxied. To do so, the intercept module builds and maintains the proxy mapping table (PMT). This table tracks the network addresses of proxies that are situated on the path to a particular connection destination (i.e., server). That is, in order to proxy a connection for a particular server S from the CP through an SP to S, the proxy agent in the CP maps the address of S to the address of SP, and the PMT provides this capability.

Each packet is also checked against NAT table 430 to determine if the network addresses and/or transport ports of the packet should be rewritten. NAT protocols and processes are described in Request for Comments (RFC) 1631, which is generally available and is incorporated herein by reference for all purposes, though NAT is employed herein to facilitate connection interception rather than providing address translation between private and public networks. Entries in the NAT table match the endpoints of an established network connection (i.e., they specify the transport protocol, the source address/port and the destination address/port).

If the packet's address and port information match an entry in the NAT table, then the destination address of the packet is rewritten to be the target address listed in the table, which in the case of input packets, is the local address of the proxy host, and the packet is forwarded to the local network stack, where it is intended to be received by a local proxy agent. Because the address has been rewritten and the proxy agent does not have access to the old address (but may require it to perform its function), the proxy agent can query the NAT table to determine the original destination of the packet (i.e., the destination address of the packet before its destination address was rewritten). This mechanism causes the client to believe that it has a connection established with the original server even though the connection is terminated at the local proxy agent in the CP.

The intercept module also receives each packet that is sent from a proxy agent on the local host, and NAT table 430 is similarly consulted when packets are sent from the proxy host toward the client or server. In other words, packets that originate from a local proxy agent are checked against the NAT table to determine if the network addresses and/or transport ports of the packet should be rewritten. Unlike prior art methods for proxying transport connections, this mechanism causes the server to believe that it has a connection established with and addressed to the original client, even though the connection is terminated at the local proxy agent in the SP. This contrasts with a Web proxy, for example, where the proxy creates a connection with the server and the server terminates a connection from that proxy and the proxied client address or addresses are ultimately invisible to the server.

Through the use of NAT in this fashion, the CP proxy agent establishes a network connection with the client such that the client believes it is communicating with the server. Similarly, the SP proxy agent establishes a connection with the server such that the server believes it is communicating with the client, where belief is sometimes represented simply as acting as if that were the case and having operations proceed normally as they would if the believed fact were true.

A packet that is not a connection request and that does not match an entry in the NAT table is simply forwarded unmodified to the interface opposite of where the packet originally arrived, thus providing a transparent relaying function for traffic that is not to be proxied. This traffic includes packets such as link level broadcast or multicast packets, as well as packets that are not to be proxied because the probe mechanism described herein did not discover a second proxy device on the path to the server.

Given the PMT and a new connection request, the intercept module looks up the destination address of the connection request in the PMT. If the PMT indicates that there is a corresponding proxy on the network path, the intercept module proxies the connection to the local proxy agent by installing a new NAT rule for the connection in the NAT table. This ensures that future packets that are part of the connection are forwarded to the local proxy agent. The connection request packet itself is then sent through the NAT operation and thereby forwarded to the local proxy agent, which establishes a new connection with the client. Because of the NAT operation, the CP establishing this connection with the client appears to the client as if it were the server.

In the example described above, because the connection is terminated at the local proxy agent, there is a chance the connection is set up successfully even though the server may have crashed or otherwise would refuse the connection from that particular client. To deal with that condition, the CP might delay the establishment of the client-to-CP connection until the SP-to-server connection has succeeded. This can be accomplished by having the CP delay its acknowledgement of the connection request (e.g., in TCP, by delaying the transmission of the SYN-ACK packet) until a message is received from the server or SP indicating that the SP-to-server connection has been successfully established. If the SP-to-server connection fails for some reason, the SP notifies the CP and the CP then resets the pending connection (e.g., in TCP, by sending a reset packet back to the client).

If a probe attempt determined that there is no SP on the path to the server, the PMT stores a "no-proxy" map entry indicating that this probe attempt failed. When a connection request for the server is looked up, the no proxy disposition informs the proxy device to avoid proxying the connection and, instead, the connection request packet is simply forwarded unmodified towards the server. Because no NAT is configured for this connection, all remaining packets for this connection are bridged without modification.

Connection Interception

As mentioned above, when a connection request packet arrives at a CP and the PMT has a map entry corresponding to the destination server identified in the connection request packet, the connection request packet is forwarded to the local proxy agent on the CP. Due to the NAT table in the CP, the proxy agent establishes a connection with the client such that the client believes it is communicating with the server.

The CP proxy agent also establishes a connection of some form with the SP, which is identified by consulting the PMT using the server destination address of the original client connection. This may be a new network connection from the CP to the SP, or a new virtual channel representing the client-server connection multiplexed over an existing network connection between the CP and the SP. In the virtual channel case, messages from various client-server sessions between common CP/SP pairs can be multiplexed onto a single transport connection or virtual channel.

Each message includes a header that identifies the client-server session. When a message is received at the CP, the header and the message are transmitted over the virtual channel to the SP, which decodes the header, reads the message, and forwards it onto the appropriate server connection.

When the SP receives a new connection (or virtual connection) from the CP representing a client-server connection, the CP sends the SP a message informing the SP as to which server and port the original client connection should be sent. The SP, in turn, installs an entry in its NAT table that maps the source address of the forthcoming SP-to-server connection to the original client address. Then, the SP initiates a connection to the target server and port, and by virtue of the NAT, a connection is established between the server and the SP such that the server believes it is communicating directly with the original client.

Figure 8:
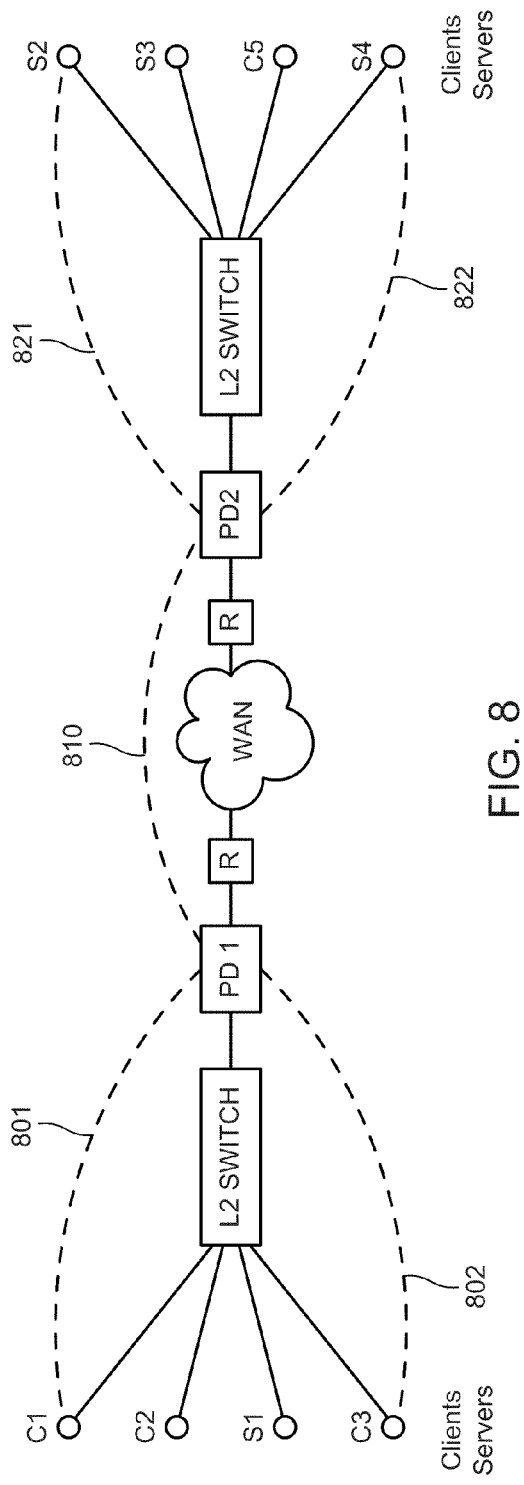
FIG. 8 is a diagram illustrating multiple connections used for interactions between clients and servers over a WAN.

FIG. 8 is a diagram illustrating this multi-connection approach used for interactions between clients and servers, which may also be termed split-termination. As shown there, several clients C and/or servers S are coupled to an L2 switch that is in turn coupled to a first proxy device PD 1. Proxy device PD 1 is coupled, via routers and a WAN, to a second proxy device PD 2. Proxy device PD 2 is in turn coupled to a second L2 switch that serves another set clients and/or servers.

Proxy device PD 1 is a CP and proxy device PD 2 is an SP for the example transactions shown, but it should be understood that a proxy device could be a CP and an SP at the same time for different transactions. The proxy devices might execute the auto-discovery protocols described herein, or are otherwise configured to be aware of each other.

Various network connections are illustrated by dashed lines. For example, suppose client C1 desires a connection to server S2. The connection is transparently intercepted such that client C1 ends up with a transport connection 801 terminated at the CP (PD 1), but because of NAT, client C1 cannot tell that it is not in fact communicating directly with server S2. Likewise, as part of the process, the CP establishes a different transport connection 810 between itself and the SP (PD 2).

In turn, the SP establishes a transport connection 821 that corresponds directly to the client's transport connection 801. Because of NAT, server S2 cannot tell that it is not communicating directly with client C1.

Then, whenever client C1 sends a message over connection 801, the CP relays it over connection 810 to the SP, which relays it over connection 821 to server S2. Likewise, whenever server S2 sends a message over connection 821, the SP relays it over connection 810 to the CP, which relays it over connection 801 to client C1.

If another client, C3, initiates a transport connection to another server, S4, the connection is transparently intercepted such that client C3 ends up with transport connection 802 terminated at the CP. Because of NAT, client C3 believes it is communicating directly with server S4. Likewise, as part of this process, the CP can reuse the transport connection 810 between itself and the SP to handle messages between client C3 and server S4. In turn, the SP establishes a transport connection 822 corresponding directly to the client connection 802, and because of NAT, server S4 believes it is communicating directly with client C3.

Following that setup, whenever client C3 sends a message over connection 802, the CP relays it over connection 810 to the SP, which relays it over connection 822 to server S4. Likewise, whenever server S4 sends a message over connection 822, the SP relays it over connection 810 to the CP, which relays it over connection 802 to client C3.

Because connection 810 is used by both the C1/S2 session as well as the C3/S4 session, a method for associating data transmitted over that connection to the appropriate session must be employed. As described earlier, this can be accomplished by including a header with each transmitted message that indicates the client-server session associated with the transmitted message.

Transparent interception is described above, in which end device (e.g., client, server) believes its connection is terminated at the other end device. Proxy devices might also or instead use nontransparent interception. In nontransparent interception, addresses of the proxy devices are exposed to the end devices. Thus, the address of the CP might be exposed to the client and the address of the SP might be exposed to the server, with each end device configured to talk directly with its corresponding proxy device client.

Certain protocols such as CIFS, NFS, and HTTP are amenable to nontransparent operation, because those protocols allow the client to communicate directly with an intermediary that has a different address from the origin of a communication connection. This architecture is feasible, but it can be challenging to deploy. There are many different approaches to solving the integration challenges of nontransparent configuration, but they typically require hard-to-maintain (either manually or automatically) mapping tables in the proxy devices. That is, in order for a client-side proxy device to know which server-side proxy device to connect to, it must somehow learn what server the client actually wants to communicate with (via protocol-specific knowledge or some protocol-specific mapping model) and, in turn, must determine which server-side proxy device is near the server in question. This is generally complex and cumbersome, except for protocols like HTTP that were explicitly designed to allow a client to connect explicitly to a proxy and have the client include the server's name in every header of every request message. Thus, where there is some advantage to nontransparent operation and it is feasible, it can be used instead of the transparent interception described herein.

In other cases, a hybrid configuration is desirable, where transparency is used at the CP but not at the SP. In this configuration, the server-side NAT is not employed, thereby alleviating the requirement that the server-side proxy be in the direct network path. This is a benefit in the data center, where very high bit rates might be concentrated onto one or two primary network links. Some embodiments of the invention suitable for environments in which a server-side proxy (or client-side proxy) is not in a direct network path between a server and a client are described in one or more following subsections.

Transport Optimization

Once a proxy pair is established, there are number of possible actions that the proxy pair could take. Some of those actions might involve optimizing the transported communications. While there are a great many optimizations that may be carried out with a proxy pair, one particular mechanism involves transport protocol optimization whereby a client and/or a server implement legacy transport protocols while CP-to-SP connections are supported with more modern or otherwise optimized transport protocols. In this fashion, the client and server may implement legacy versions of transport protocols across a LAN, where protocol performance is not necessarily crucial, while enjoying the protocol enhancements of a different transport protocol between and among proxy agents.

In one embodiment, this transport protocol optimization is applied to TCP, wherein two TCP end points believe they are speaking to one another by virtue of transparent interception, as described above. The CP-to-SP protocol can be virtually any protocol that allows the proxies at both ends to emulate the reliable, in-sequence delivery semantics of TCP. One such approach is to implement a modified form of TCP for the CP-to-SP connection that implements the reliability semantics of TCP but enjoys different congestion control dynamics.

Congestion control refers to methods that networks use for discrete network connections to parcel the available network bandwidth on a shared network link. One aspect of TCP's congestion control algorithm is the notion of "slow start", whereby a TCP connection slowly increases the amount of bandwidth available to an application to avoid flooding a potentially constrained link with data. The main drawback to a slow start TCP connection is that an application that has a short-lived connection may never reach the full link capacity because the slow start mechanism does not complete its ramp-up before the connection expires or is no longer needed.

With a pair of proxies in the network path, it is possible to intercept a number of TCP connections and multiplex them over a single long-lived connection between the two proxies. This long-lived connection would be able to avoid the problems of slow start, even if each individual connection is short-lived. In addition, it is possible for the two proxy hosts to employ more sophisticated congestion control algorithms for the multiplexed connection channel, which can result in better performance for the set of proxied connections.

Other enhancements can be made to the congestion control algorithm in the CP-to-SP connection, such as those described in Floyd, S., "High-Speed TCP for Large Congestion Windows", IETF Internet Draft draft-floyd-tcp-high-speed-02.txt (Feb. 20, 2003) [available at http://www.ietf.org/internet-drafts/draft-floyd-tcp-high-speed-02.txt] (hereinafter "Floyd"). Techniques described in Floyd change the TCP congestion control dynamics to provide significant performance enhancements in high latency environments, and have a number of other benefits.

Multi-Hop Automatic Proxy Path Discovery

Figure 9:
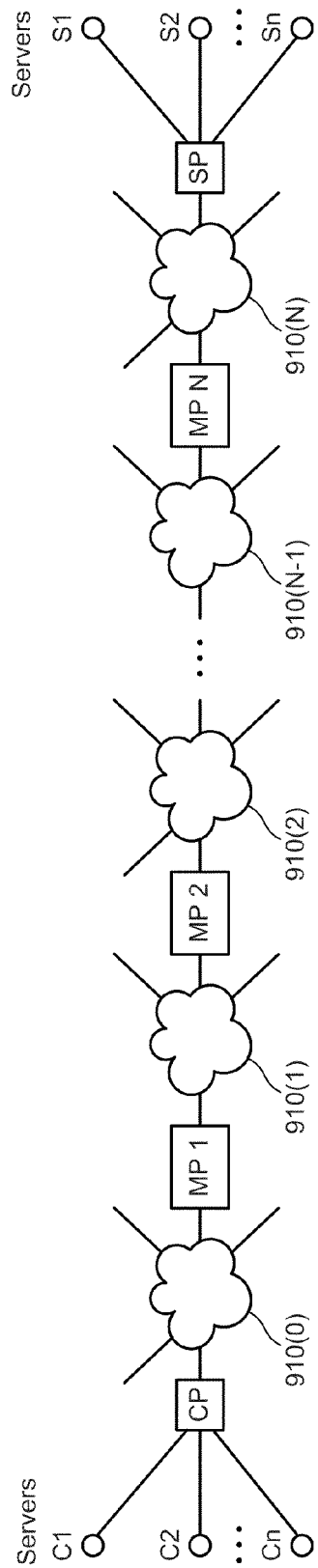
FIG. 9 is a diagram illustrating the use of more than two proxy devices in a network path, including a client-side proxy, one or more middle proxies, and a server-side proxy.

FIG. 9 is a diagram illustrating the use of more than two proxy devices in a network path between a client and a server, including a client-side proxy, one or more middle proxies, and a server-side proxy. While most of the examples used so far presume a configuration comprising a pair of exactly two proxies (one named "CP" near the client and one named "SP" near the server) and three transport connections (i.e., one between the client and CP, one between the CP and the SP, and one between the SP and the server), the present invention also encompasses topologies containing more than two proxies and more than three transport connections.

As shown in FIG. 9, a client-server connection may be transparently intercepted, processed and proxied via a sequence of more than two proxy devices. As shown, a client communicates with a server via a connection to a client-side proxy CP, which in turn communicates through a network 910(0) with a first middle proxy MP 1, which in turn communicates through a network 910(1) with a second middle proxy MP 2, and so on to an Nth middle proxy MP N, which in turn communicates through a network 910(N) with a server-side proxy SP, which ultimately communicates with the server. In this example, multiple clients and multiple servers are shown. As explained above, it need not be the case that the clients are all at one end and the servers are all at the other end. Thus, the CP might be a proxy device that also acts as an SP for other connections, and the SP might be a proxy device that also acts as a CP for other connections. As illustrated, networks 910 may include other connections and branches.

In some embodiments wherein more than two proxy devices are in the network path and are to be active for a particular client-server connection, a proxy device discovers whether it is acting as a client-side proxy by, among other techniques, detecting the absence of proxy signals or probes, and discovers whether it is acting as a middle proxy or a server-side proxy by forwarding probe packets on to the server while simultaneously sending probe responses toward the CP (or a downstream middle proxy).

As a result, each proxy device will either see a connection request acknowledgement returned from the original server or a probe response packet coming from another proxy upstream on a path toward the server. In the former case, the proxy determines that it is an SP and acts accordingly (e.g., installing the server side NAT state and so forth). In the latter case, it determines it is a middle proxy and acts accordingly (e.g., by relaying messages from the client in question to the upstream proxy in question and vice versa from the server to the client, and performing other actions expected of a middle proxy).

Throughout this disclosure, where there are multiple instances of an object and the number of instances is not critical, the instances are numbered from "0" or "1" to "N" with the understanding that the value of "N" need not be identical from use to use. For example, "N" may be used as the number of clients, servers, proxies, or other entities in various places, but that number might vary from example to example. It should also be understood that nothing here requires that all instances of a given entity be used. For example, FIG. 9 shows clients C1 through CN, servers S1 through SN, and middle proxies MP 1 through MP N. It should be understood that the number of clients, servers and middle proxies need not be identical and the actual number is not essential to an understanding of what is being shown.

Variations

With a proxy pair in place, a number of advantages accrue and other network improvements are made possible. For example, using techniques described herein, a network administrator can deploy a proxy pair that would transform and proxy all TCP connections. This can be done without requiring an upgrade of every device, server, and application that uses TCP with modern protocol enhancements to improve performance. WAN performance of all applications can be improved with the simple and straightforward deployment of such devices at appropriate points in a network infrastructure.

In some embodiments, messages are actually modified to provide additional performance benefits. For example, client-server transaction acceleration techniques as described in McCanne I can be implemented to transform network transactions for wide-area bandwidth optimization. Similarly, client-server transaction prediction mechanisms as described in McCanne III can be employed in a pair of proxy agents to mask effects of wide-area latency and thus provide significant reductions overall latency leading to increased client-server performance.

Connection Request Filtering

In some embodiments of the invention, basic proxy discovery and interception mechanisms described herein can be extended with a configuration capability that targets only certain subsets of traffic. For example, a network operator may want to configure the proxy devices to process certain types of client-server connections, but to pass-through other types of client-server connections unmodified, without interception and/or other processing. Specifically, it may be desirable to statically configure some information into a proxy device's intercept module that alters its behavior based on the protocol or application type of the underlying connections.

One simple addition to the intercept module is the addition of rules that indicate certain actions to take on a class of connections. One type of rule could indicate different actions based on the destination port in the connection request packet. With this addition, the intercept module can choose to ignore connection requests for particular configured ports or, alternatively, only act upon connection requests for particular configured ports. More generally, the rule could be a packet filter that is applied to the connection request packet, e.g., specified as a BPF packet filter (McCanne and Jacobson, "The BSD Packet Filter: A New Architecture for User-level Packet Capture", In Proc. of the 1993 Winter USENIX Technical Conference, San Diego, Calif., January 1993). Using the approach described there, whenever the intercept module processes a connection request packet, it could apply one or more packet filters to determine if the connection request should be passed on unmodified, intercepted and processed, or even dropped.

By dropping a connection request packet, the intercept module would implement functionality akin to a firewall, whereby certain connections are allowed to pass through while others are denied. The fact that a proxy device's PMT contains dynamic information resulting from probe operations enables even more sophisticated functionality than is available with a simple firewall.

For example, assume two proxies are cooperating to provide security functionality for network traffic that traverses them, whereby the traffic that is proxied goes through an encryption/decryption process. The intercept module can be configured with a rule that dictates that all traffic should be intercepted if possible to discover whether or not there is a corresponding proxy and any packets destined for servers that do not have a corresponding proxy in path should be dropped instead of forwarded. Using such a rule set, the dynamic mappings resulting from the probe process are used to indicate which connections should be dropped and which should be proxied.

Static Mapping

Static mappings are useful, for example, where a CP is in a network path between a client and a server but the SP is not in the network path. By adding static mappings to the CP's proxy mapping table (PMT), via a manual network operator process or the like rather than being discovered through the probe process, the SP need not be on the path. The static mapping is marked accordingly so that the intercept module does not attempt to refresh the mapping. A static map entry is similar to a dynamically discovered entry in that it indicates the appropriate SP to use when contacting a particular server. The CP would still intercept network connections, but would not carry out the normal probe process to discover the SP and instead would be directed to the off-path SP (although nothing prevents a network operator from statically mapping an SP that is in the path).

On-the-Fly Connection Interception

Some client-server connections may become established before any proxy or proxies could intercept the connection requests. For example, a CP could be powered on and find itself in the path of existing connections. Another possibility is that the network path for a connection could change such that the new path flows through a proxy. It is desirable to intercept these pre-existing connections such that they gain benefits provided by the proxy service.

The intercept module of a proxy device can determine whether a packet flowing through it belongs to a pre-existing connection in several ways. One method is by tracking every connection that flows through it. When a connection request packet arrives at the intercept module, it can begin updating or creating state for that connection, including, but not limited to, the existence of that connection, whether the connection request succeeds, and when the connection is terminated. If a packet arrives for a connection for which the intercept module has no state, then it could conclude that this packet is for a pre-existing connection.

Once the intercept module identifies a pre-existing connection, it could further try to identify whether the connection flows through an SP. It could do this in several ways. One way is to examine a table of known destination to SP mappings; the table's entries could come from previous runs of the proxy discovery protocol, or via manual configuration, or via some other method. It could also attempt some form of proxy discovery protocol for the destination of the pre-existing connection.

Once the intercept module has discovered the peer intercept module on the other side of a pre-existing connection, it can take some action to cause the connection to be intercepted. One such action is to tear down the existing connection by injecting one or more "reset" packets into the client-server session. This will cause the connection to fail, and in some cases, the application will simply establish a new connection with the server automatically. When the new connection request flows through the CP, it can then go through the process described earlier to cause the connection to be intercepted.

However, other applications may report an error to the user and halt the process when their underlying connection or connections fail. To address this, rather than reset the connection, the CP and SP can intercept the connection on-the-fly by observing the current protocol parameters in the active session (e.g., sequence numbers, advertised window, and so forth) and recreate the necessary protocol state within the proxy device along with the appropriate NAT rules to cause the connection to be intercepted midstream.

Connection Deflector

Figure 10:
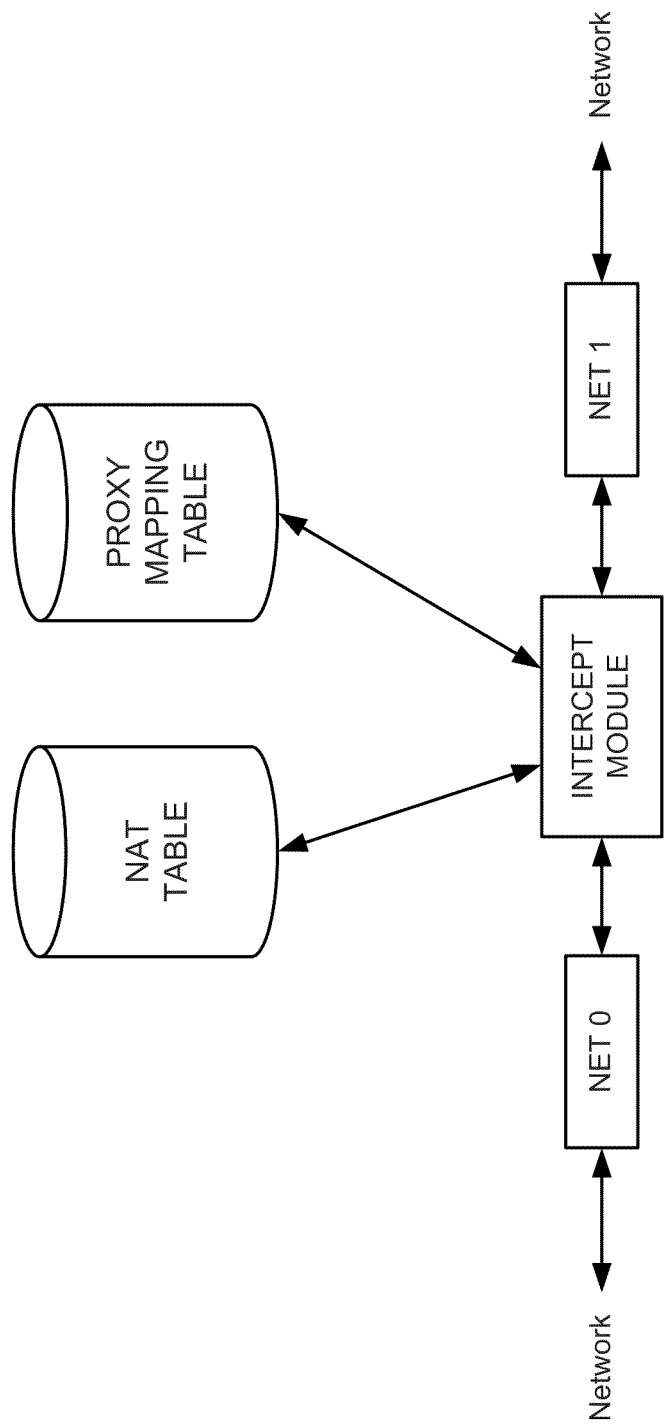
FIG. 10 is a diagram illustrating a connection deflector housing intercept and NAT functions in a stand-alone network device.

In another embodiment of the present invention, an intercept module and network address translation (NAT) and proxy mapping tables are embodied in a network device that is separate from a proxy. FIG. 10 illustrates this arrangement, where the intercept and NAT functions are housed in a stand-alone network device called a "connection deflector". A connection deflector, in this form, is by itself a new type of network device that can provide server-side transparency to a proxy configuration without placing the proxy device in the path between the client and server. Instead, the connection deflector may be placed in the path, and operate to apply NAT to packets to one or more proxies that are not in the path.

A connection deflector may optionally include the logic described earlier for automatically populating entries in the proxy mapping table (PMT) to perform proxy pair auto-discovery, but the device is also useful without this. In this simpler case, the PMT is populated with static entries (e.g., entered via user configuration).

Figure 11:
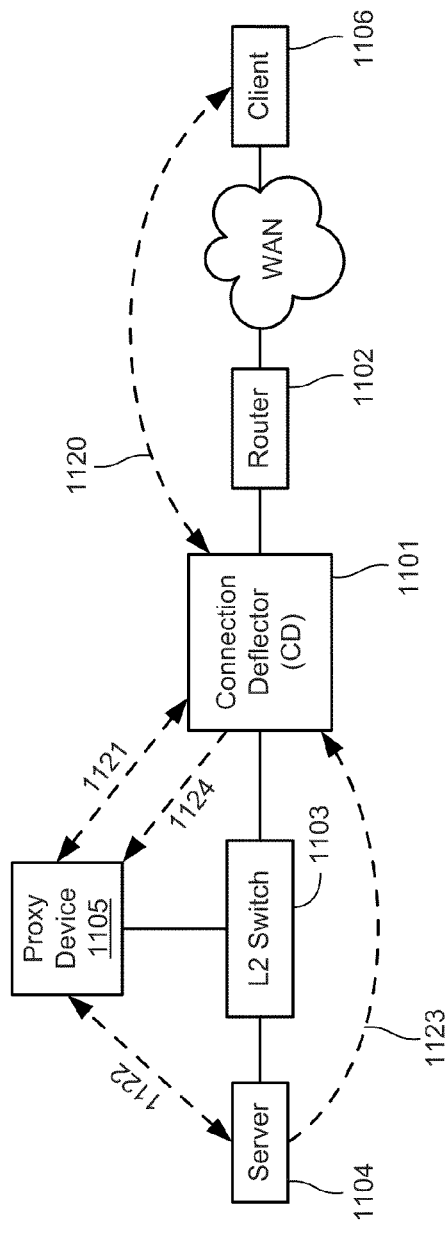
FIG. 11 is a diagram illustrating a connection deflector (CD) deployed to implement proxy interception in a manner that is fully transparent to a server.

FIG. 11 illustrates how a single connection deflector (CD) may be deployed to implement proxy interception in a manner that is fully transparent to the server. In the illustrated implementation, CD 1101 is situated in-path between a router 1102 and a layer-2 switch 1103. Attached to the switch are a proxy 1105 and a server 1104. The intercept module within CD 1101 forwards all packets between the switch and the router.

When CD 1101 encounters a connection setup packet (e.g., a TCP SYN packet) from a client 1106 addressed to server 1104, it creates two NAT rules and installs these rules in its NAT table: a first rule causes the client-server flow in question to be directed toward proxy 1105 instead of server 1104, and a second rule causes packets sent from server 1104 to client 1106 on the return port to also be directed to proxy 1105 instead of the client. The proxy address for the NAT rule is determined from the PMT.

Optionally, when CD 1101 forwards a connection setup packet to proxy 1105, the connection deflector appends a message option in the connection setup packet to signal the server address to the proxy, thereby allowing the proxy to know that the client had initiated the connection to go to that particular destination. In turn, proxy 1105 terminates the transport connection from client 1106 and initiates a new transport connection 1122 to server 1104, but NATs the connection so the packets that server 1104 receives over connection 1122 appear with a source address that corresponds to client 1106.

As a consequence, server 1104 generates return packets addressed to the client rather than proxy 1105, along path 1123. These packets are thus conveyed toward the client, through switch 1103 and CD 1101. At this point, the second NAT rule in CD 1101 mentioned above matches the packets and causes them to be transformed via NAT and directed to proxy 1105 along path 1124. Finally, proxy 1105 receives the packets, associates them with connection 1122 and processes them as if they had originated from the server and had originally been addressed to the proxy. Thus, proxy 1105 has successfully intercepted transport connection 1120 from client 1106 to server 1104 in a way that is completely transparent to server 1104.

A connection deflector is not limited to interoperating with a single proxy, single server and single client as depicted in FIG. 11, but instead may support an arbitrary number of proxies, servers and clients. By configuring different NAT rules for different server and proxy combinations, an arbitrary number of entities are supported. Moreover, the proxies need not attach directly to the layer-2 switch but can be anywhere in the routed network. The only requirement is that the connection deflector be situated in both the forward and backward paths between the client and server so that network address translation can be properly applied to traffic in both directions.

Figure 12:
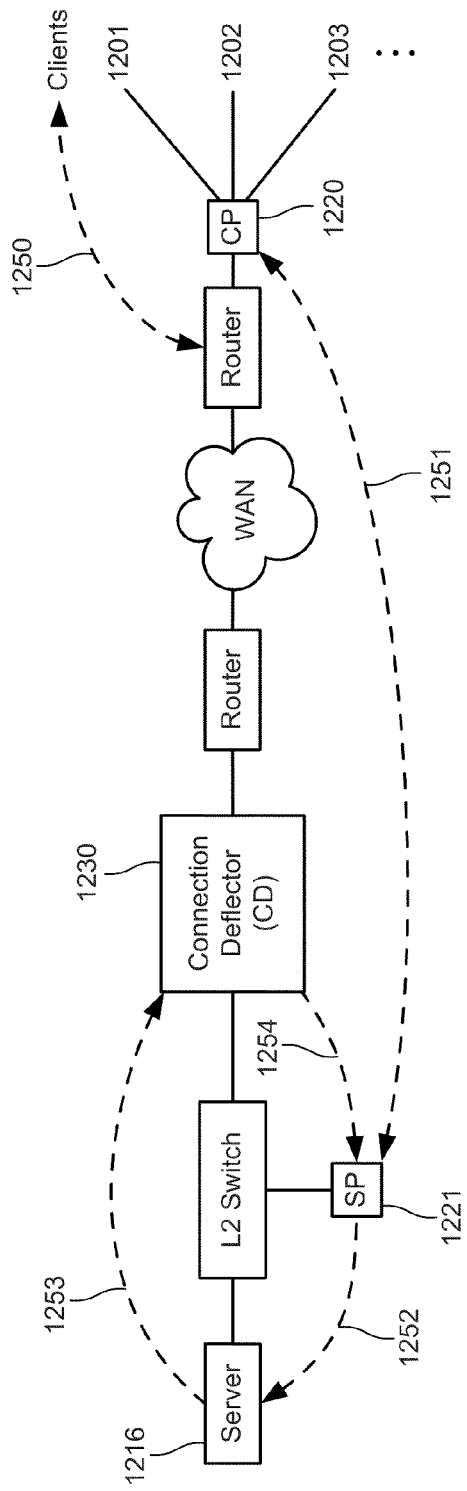
FIG. 12 is a diagram illustrating a client-side proxy (CP) and a server-side proxy (SP) situated with respect to a connection deflector.

In another embodiment, a connection deflector's intercept module includes probing capabilities to perform proxy pair auto-discovery as described earlier. FIG. 12 shows how a client-side proxy (CP) and a server-side proxy (SP) may be situated with respect to the connection deflector. Here, CD 1230 is situated in the network data path, but SP 1221 is situated out of path attached to a layer-2 switch. This separation is amenable to high performance implementation as it allows simple network functions like packet forwarding, NAT, probe generation and interpretation, and so forth to be implemented in a dedicated network device, while higher level proxy functions can be implemented in a general purpose computing device that is not in the critical path of the network.

In this configuration, the exchange of messages that perform proxy auto-discovery is modified because the CP and SP communicate with a non-transparent connection that needs no NAT. In fact, only one NAT rule per client-server session need be installed in the CD to handle the return path from the server to the client, as the forward path is transparently intercepted at the CP. Also, the CD and CP perform auto-discovery while the SP does not.

FIG. 12 shows one way to deploy a connection deflector to perform proxy pair auto-discovery. When client 1201 initiates a connection to server 1216, CP 1220 intercepts the connection request packet and appends a probe request option as described earlier. The connection request packet is intercepted by CD 1230, which in turn responds to the probe and provides the address of SP 1221 as the contact point.

At the same time, CD 1230 installs a NAT rule that causes traffic sent from server 1216 to client 1201 on the return port of the connection in question to be diverted via NAT to SP 1221. CP 1220 then terminates the client connection 1250 and initiates a new connection (or virtual connection) 1251 to SP 1221. Next, SP 1221 initiates a connection 1252 to server 1216 on behalf of CP 1220 and NATs the source address so that server 1216 believes the incoming connection is arriving from the client, even though the connection originates from SP 1221.

Thus, the return packets from server 1216 corresponding to connection 1252 follow path 1253 toward client 1201. When the packets reach CD 1230, the newly installed NAT rule matches the packets and causes them to be NAT'd and diverted back to SP 1221. Thus, the CP, SP and CD successfully discovered the presence of one another and intercepted the client-server connection, without having the SP in the network path and while maintaining strict transparency for the server.

Clustering and Load Balancing

The configuration of FIG. 12 can be generalized with multiple SPs at the server site to support clustering and load balancing. Suppose there are N SPs instead of just one. Then, CD 1230 could select one of the N server-side proxies and return the address of the selected SP to the CP in a probe response packet. The selection could be based on availability, load and/or other factors.

Or, preferably, CD 1230 could return a list of available SPs to CP 1220 in the probe response packet. This would allow CP 1220 to store the list in its PMT and select an SP using its own discretion. For example, it might favor one primary device over other secondary devices and only use secondary devices when the primary device is unavailable or near capacity. Depending on the particular functions the proxy performs, such a policy could enhance the performance of proxy pairs since the same pairs will tend to be used consistently over time. Another approach is to have the CP employ a consistent hash (e.g., as a function of the server and client addresses) so that the same client-server sessions are consistently mapped onto the same SP, again enhancing the performance of the proxy end points.

Variations

Figure 13:
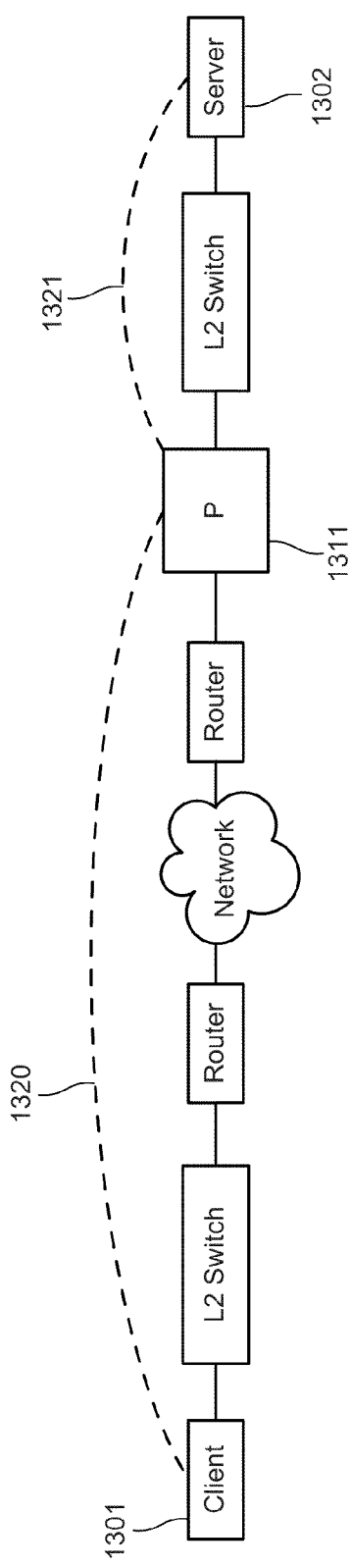
FIG. 13 illustrates a variation of a proxy device, where a single proxy intercepts client connections and server connections, but interacts with each using the other's address.

FIG. 13 illustrates a variation that is useful beyond auto-discovery of proxy pairs and can be used with an unpaired proxy. In this variation, a single proxy 1311 is situated in a path between the client 1301 and the server 1302 such that all traffic along the forward path from client 1301 to server 1302 flows through proxy 1311 and all traffic along the reverse path from server 1302 to client 1301 also flows through proxy 1311.

When client 1301 initiates a connection 1320 to server 1302, proxy 1311 intercepts the client packets and terminates the connection within that device even though the packets comprising the connection are addressed to server 1302. In addition, all packets to client 1301 that originate from proxy 1311 as part of connection 1320 are assigned a source address that corresponds to the address of server 1302. Thus, client 1301 appears to itself to be communicating directly with server 1302 even though connection 1320 is terminated at proxy 1311. When proxy 1311 successfully establishes connection 1320, it establishes another connection 1321 with server 1302, whereby it assigns a source address to all packets it originates to server 1302 on connection 1321 with the address of client 1301. Thus, server 1302 appears to itself to be communicating directly with client 1301 even though connection 1321 is terminated at proxy 1311.

Once the connections have been established, messages can be transmitted between the client and the server in either direction through the proxy intermediary, which can perform the arbitrary transformations on the connection data as described herein and elsewhere.

Figure 14:
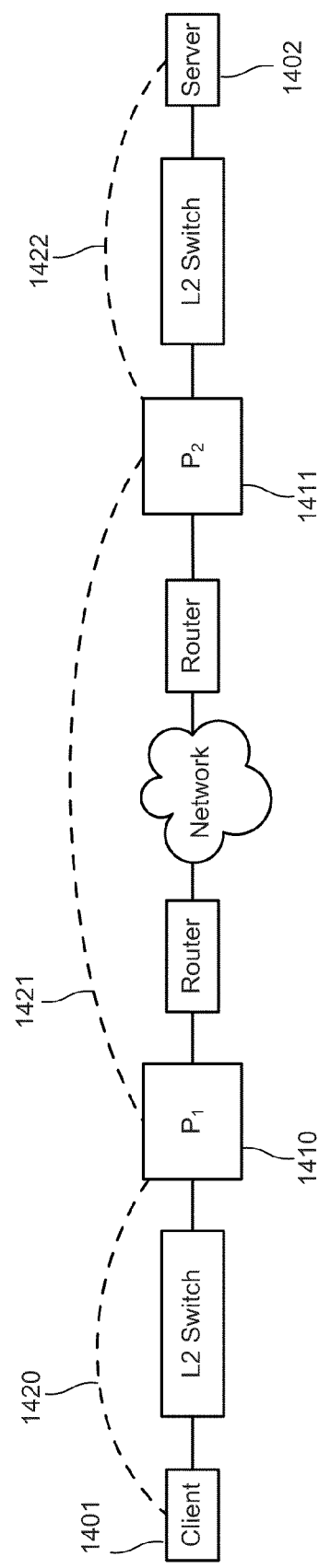
FIG. 14 illustrates another variation, wherein a pair of proxy devices are used as shown in FIG. 13.

FIG. 14 illustrates the variation of FIG. 13 with a pair of proxies instead of a single proxy. In FIG. 14, proxies 1410, 1411 are situated in-path between the client 1401 and the server 1402 such that all traffic along the forward path from client 1401 to server 1402 flows through proxy 1410 and all traffic along the reverse path from server 1402 toward client 1401 also flows through proxy 1411.

When client 1401 initiates a connection 1420 toward server 1402, proxy 1410 intercepts the client packets and terminates the connection within that device even though the packets comprising the connection are addressed to server 1402. In addition, all packets to client 1401 that originate from proxy 1410 as part of connection 1420 are assigned a source address that corresponds to the address of server 1402. Thus, client 1401 appears to be communicating directly with server 1402 even though connection 1420 is terminated at proxy 1410.

Proxy 1410 opens another connection 1421 to proxy 1411. Alternatively, proxy 1410 could re-use an existing connection between proxy 1410 and proxy 1411, and implement connection multiplexing as described earlier. When proxy 1410 and proxy 1411 successfully establish connection 1421, proxy 1411 establishes connection 1422 with server 1402, in which the source address assigned to all packets originated by proxy 1411 is the address of client 1401. Thus, server 1402 appears to be communicating directly with client 1401 even though connection 1422 is terminated at proxy 1411.

Once the connections have been established, messages can be transmitted between the client and server in either direction through the proxy intermediaries, which can perform the arbitrary transformations on the connection data as described herein and elsewhere.

Interception and Split-Termination of a Cloud-Based Client-Server Connection

In cloud-based computing environments, multiple virtual servers, applications or services desired by a client may be deployed in various network topologies, and in some cases may share network addresses through a mechanism such as network address translation (NAT). Similarly, multiple clients in the same network domain may also use NAT when accessing cloud-based computing services such that the different clients appear to be using the same network address.

An entity or organization responsible for optimizing or otherwise manipulating a client-server connection for purposes of optimizing or otherwise transforming client-server transactions may be unable to control relevant aspects of the network topology, or configurations of the client and/or server (e.g., their network addresses).

In particular, the entity responsible for processing the client-server connection may be unable to install a network device (e.g., a switch, a router) in a location that is traversed by all client-server communications, and may be unable to set the client's or server's addresses so that communications to/from the client or server traverse a particular network device. In these types of environments, interception and split-termination of a client-server communication connection may not be possible using an "in-path" solution described previously, wherein one or more network devices are installed directly within the path of all client-server communications.

Some embodiments of the invention are therefore configured to use a proxy device, a transaction accelerator or other intermediate device "out-of-path" to facilitate the interception and split-termination of a client-server connection with a cloud-based server and/or a cloud-based client.

Figure 15:
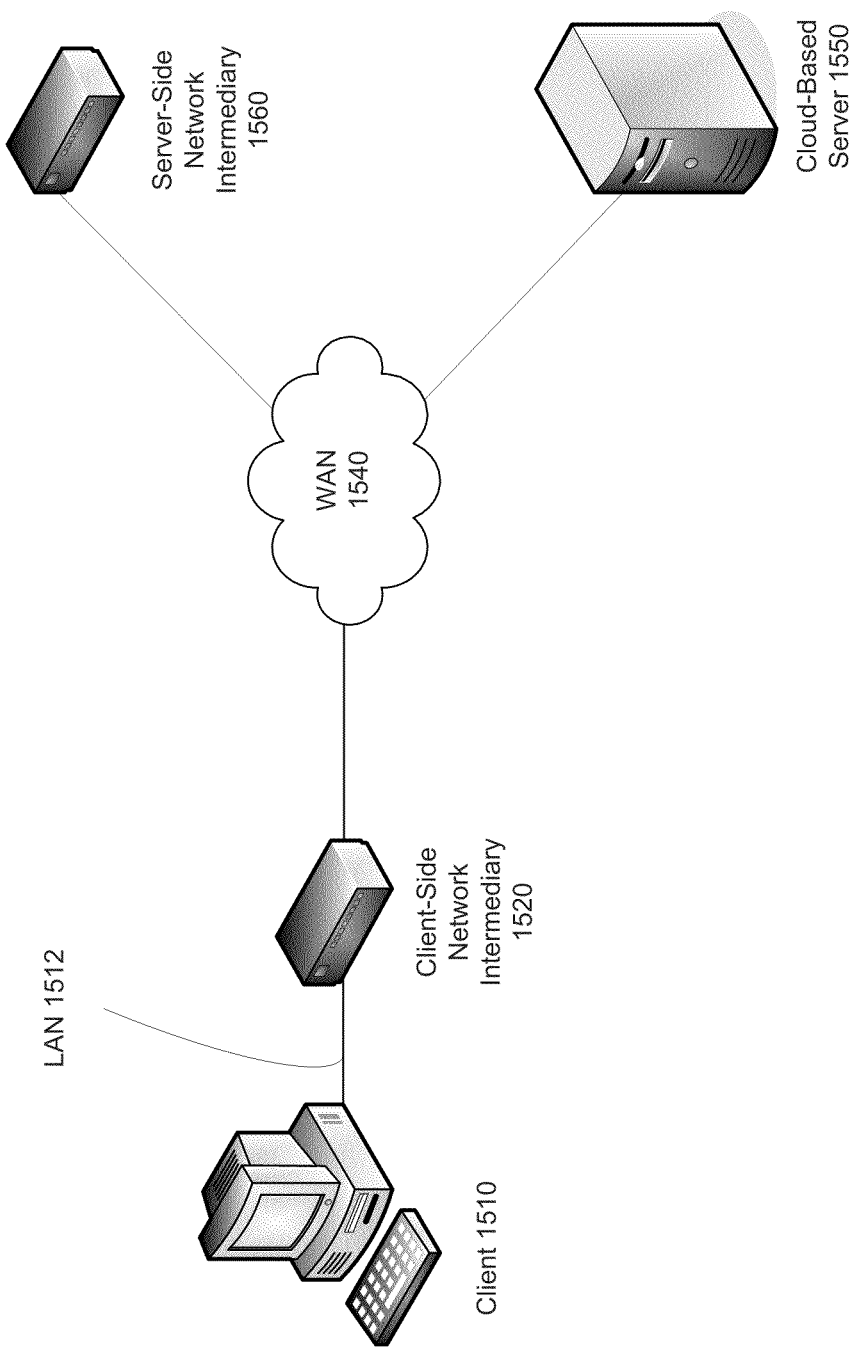
FIG. 15 is a block diagram of a computing environment in which a client-server communication connection involving a cloud-based server may be intercepted, according to some embodiments of the invention.

FIG. 15 illustrates an environment in which some embodiments of the invention may be implemented. In FIG. 15, client-server connections are desired between client 1510 and cloud-based server 1550, which are separated by WAN 1540, which may comprise the Internet.

Network intermediaries 1520, 1560 are employed for purposes of optimizing or otherwise transforming client-server transactions and may be configured similar to proxy devices described in previous sections. As seen in FIG. 15, although intermediary 1520 may be considered in-path with regard to the client-server communications, network intermediary 1560 is not.

Intermediary 1520, which is located in relative proximity to client 1510, may be termed a client-side intermediary (or CSI), while intermediary 1560, which may be cloud-based, may be termed a server-side intermediary (or SSI). Although a CSI will generally be capable of terminating a client-server connection with a client, and an SSI will be capable of terminating the client-server connection with a server, appellations such as "client-side" and "server-side" are not meant to restrict the role or functionality of a given network intermediary. Thus, a given intermediary may perform the roles of CSI and SSI for different communication connections.

Although not shown in FIG. 15, additional client-side intermediaries may cooperate with server-side intermediary 1560, and/or other server-side intermediaries may cooperate with client-side intermediary 1520.

In some embodiments of the invention, network intermediaries 1520, 1560 are Steelhead® transaction accelerators from Riverbed® Technology, and are configured to optimize communications and applications (e.g., through compression or acceleration). Transaction accelerators are referred to in the art by many different terms, including, but not limited to, wide area network (WAN) accelerators, WAN optimizers, WAN optimization controllers (WOCs), wide-area data services (WDS) appliances, WAN traffic optimizers (WTOs), and protocol accelerators or optimizers. In other embodiments, the intermediaries may be configured to perform other operations in addition to or instead of optimization, such as routing, caching, etc.

In some embodiments of the invention, network intermediaries 1520, 1560 proxy for client 1510 and server 1550 to intercept and split-terminate a client-server connection. In order to determine the other's existence, either or both of the intermediaries may engage in a method of auto-discovery, as described previously, using probe queries and responses. For example, when a client-server communication request is issued by client 1510, intercepted by CSI 1520 and forwarded toward server 1550, the CSI may receive a return acknowledgement (or other response) directing it to continue establishment of the connection through SSI 1560.

Alternatively, a network intermediary may be explicitly advised of the existence of another intermediary or may be programmed with an address or other identifier of another intermediary.

FIG. 15 reflects a type of cloud-based computing environment in which server 1550 provides web services and/or other application services to client 1510. Illustratively, the services may be hosted by virtual machines executing on the server. In this type of environment, cloud-based server 1550 may be operated by an organization different from the organizations or entities that operate or provide client 1510 and network intermediaries 1520, 1560.

Although an entity that purchases or leases services provided by a cloud-based server such as server 1550 may be able to host various web and application services on virtual servers executing on server 1550, that entity is likely unable to configure a network address of server 1550 or to install a network device (e.g., a network intermediary, a proxy, a switch) in a location that can receive or intercept all network traffic to and/from the physical server.

Therefore, in some embodiments of the invention, an intercept module or driver is installed on server 1550 and redirects to SSI 1560 connection requests that are not received through the server-side intermediary. The intercept module is not depicted in FIG. 15, but is described in more detail below.

In some implementations, the client (or CSI 1520 acting on behalf of the client) is configured to direct a request for a client-server connection to server 1550 or a desired service. The intercept module may act as a front-end or interface for server 1550 or for one or more applications/services hosted by the server. The intercept module is configured to intercept the request before it reaches the desired service, and to redirect the connection request through SSI 1560, thereby alerting CSI 1520 to the SSI's availability. The intercept module may thus facilitate the intermediaries' auto-discovery process.

The intercept module may execute in each virtual machine of server 1550 that hosts a service to which client 1510 will connect or, alternatively, may execute in its own virtual machine or in the host operating system. In whichever virtual machine or operating system instance it executes, the intercept module may be installed in the network protocol stack. For example, and as shown in FIG. 5, an intercept module may operate above the link layer, but below the network layer, comparable to a virtual private network (VPN).

In other embodiments of the invention, the intercept module may be instantiated or hosted in some other manner. For example, the intercept module may operate as a listener or other type of interface or service for receiving communication connections, service requests and/or other messages.

Figure 16:
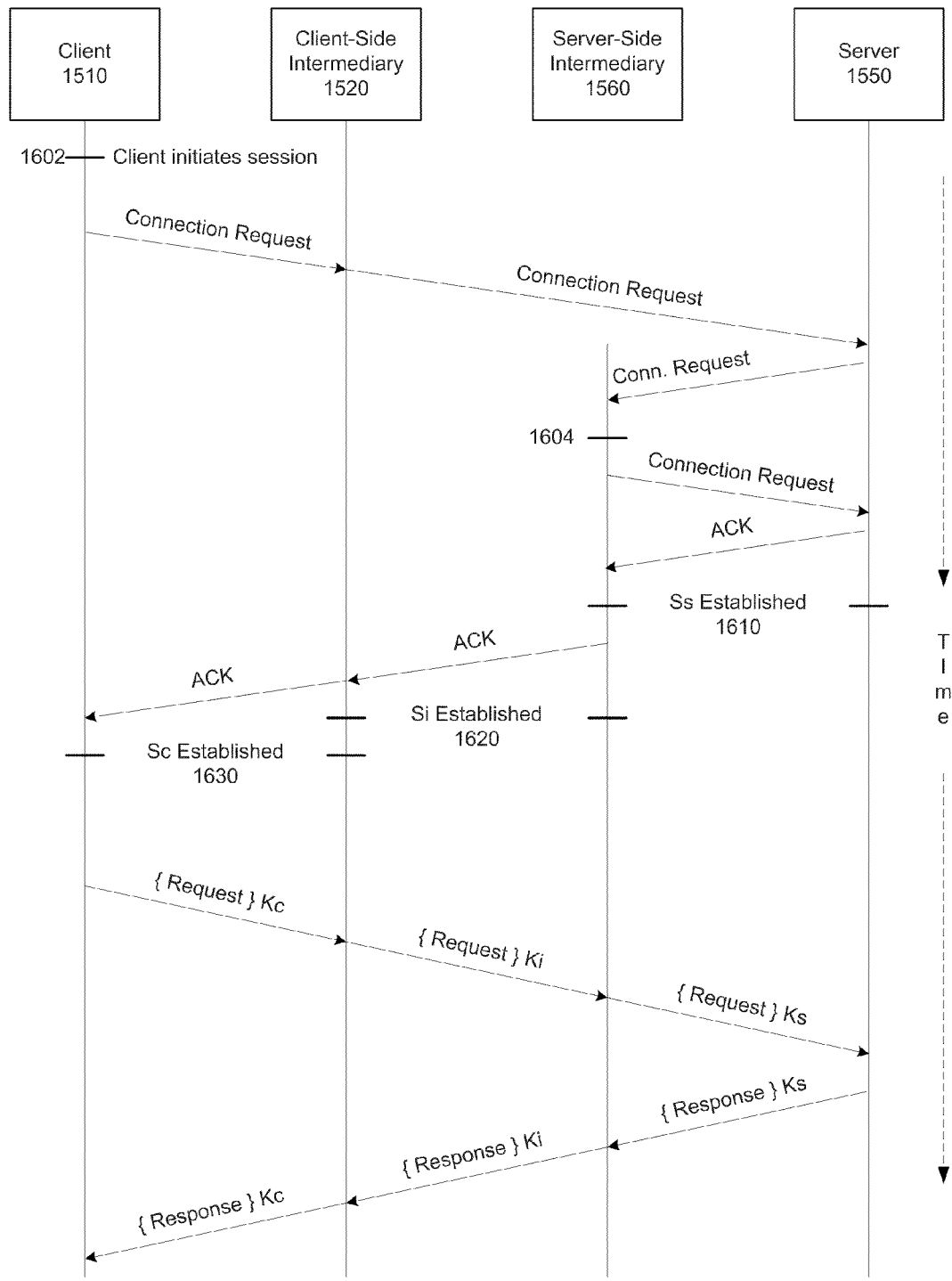
FIG. 16 is a timing diagram describing a process for intercepting communication connection between a client and a cloud-based server, according to some embodiments of the invention.

FIG. 16 is a timing diagram illustrating the interception and split-termination of a client-server communication connection between client 1510 and server 1550 of FIG. 15, according to some embodiments of the invention. It may be noted that, in these embodiments, some or all entities participating in the connection (e.g., client 1510, CSI 1520, SSI 1560, server 1550) communicate using their true network (e.g., IP) addresses. As described further below, these embodiments may be readily adapted for use with network address translation (NAT).

The sequence of messages or communications reflected in FIG. 16 is meant to be illustrative in nature. Thus, although a given message may be indicated as occurring before or after another given message, in other embodiments of the invention the order of those two messages may be reversed or they may occur substantially simultaneously.

For example, and as described below, split-termination of the client-server connection results in three separate communication sessions, which may be established in any temporal order. A first connection is established between the client and the CSI, a second between the CSI and the SSI, and the third between the SSI and the server.

In an embodiment of the invention illustrated in FIG. 16, the client initiates a request for a client-server communication connection at time 1602. That request is readily intercepted by CSI 1520 because the client-side intermediary is in-path for client 1510. In other embodiments, the CSI could instead be out-of-path with regard to the client and the server. In this case, measures may be taken to ensure the client's connection request is routed to the CSI; such measures are described herein and/or may be derived from descriptions of other embodiments of the invention.

Upon receipt of the client's connection request, client-side intermediary 1520 forwards it (or issues a new request) toward the same destination as the client's request (i.e., server 1550). In the illustrated embodiment of the invention, CSI 1520 has not yet learned of the existence of SSI 1560, and so it does not know whether a server-side intermediary is available to participate in this connection. Therefore, and as discussed above, the connection request issued by the CSI may comprise a probe query that signals the CSI's existence.

Because SSI 1560 is out-of-path (e.g., "in the cloud") relative to the client and the server, the client-server connection request reaches server 1550 without transiting the SSI. An intercept module or driver that executes on the server (e.g., in conjunction with or as part of a service requested by the client) forwards the connection request (or a substitute request) to the SSI without submitting it to the target application or service (e.g., a web server, a database server, an application server). Illustratively, the intercept module may deflect/redirect all connection requests that do not originate from addresses of known SSIs, or may apply other criteria to determine whether or not to deflect a particular connection request.

In some embodiments of the invention, the redirected connection request may be sent to a private (or public) address of the SSI, and may be encapsulated (e.g., in UDP) or transmitted via a tunnel or other specialized communication channel.

In these embodiments of the invention, the intercept module is configured to know of SSI 1560 and/or other server-side intermediaries that may be called upon to participate in client-server connections. Illustratively, connection requests may be deflected or redirected to particular SSIs based on the target application/service, the requesting client (e.g., network address or other indicia) and/or other factors.

As described below, in some embodiments of the invention, a centralized service or portal may be maintained to exchange network addresses or identities between entities (e.g., intermediaries, servers).

At time 1604, server-side intermediary 1560 has received the redirected connection request, and may proceed as if it had received the connection request from the CSI. It therefore issues a connection request (or re-submits the same request) to server 1550. Although the request is on behalf of client 1510, it is received at the server from a known SSI (and from the SSI's address), and so the intercept module accepts it and submits it to the target application/service or opens a session with the application/service.

The intercept module may apply network address translation in order to make the connection request appear as if it was received directly from client 1510. Server 1550 then issues an acknowledgement to SSI 1560 and completes normal TCP (or other protocol) handshaking.

Thus, at time 1610, a first session (Ss) may be established and a first portion of the end-to-end client-server connection is completed between server 1550 (e.g., the intercept module) and server-side intermediary 1560. Depending on the operative communication protocol(s), any number and type of handshaking/authentication messages (not shown in FIG. 16) may be exchanged between the SSI and the server (and/or other entities) in order to establish the SSI-server connection, apply authentication or otherwise facilitate or enhance the client-server connection.

Because the connection request that was redirected to SSI 1560 from server 1550 included the probe query from CSI 1520, the SSI was able to learn of the CSI's existence. SSI 1560 therefore returns an acknowledgement of the connection request directly to the CSI, to inform it of the successful connection with the server and to identify itself to the client-side intermediary and open a session between the intermediaries if one is not already open. Alternatively, acknowledgement of the connection request may be dispatched to CSI 1520 from server 1550 (e.g., the intercept module).

Therefore, at time 1620 a second portion of the end-to-end client-server connection is established between the two network intermediaries, and session Si may be shared between them. As described previously, this connection may be used for other client-server connections beyond the immediate connection between client 1510 and server 1550, and thus may persist for virtually any period of time.

Although not shown in FIG. 16, establishment of the intermediaries' session may involve a full exchange of handshake and/or authentication messages as dictated by the operative communication protocol and authentication procedure, which may or may not be the same protocol(s) and procedures used with client 1510 and server 1550. In addition, CSI 1520 may update a proxy mapping table (PMT), and/or other data structures, to reflect the presence of SSI 1560 (e.g., as shown in FIG. 4).

The CSI may now acknowledge the client-server connection to the client by forwarding to the client an acknowledgement message. Thus, at time 1630, another session (Sc) may be developed for a portion of the end-to-end client-server connection established between client 1510 and client-side intermediary 1520.

A more complete timing diagram for an embodiment of the invention in which a server redirects a connection request to a server-side network intermediary is provided in FIG. 19B below.

In some alternative embodiments of the invention, instead of simply deflecting an original client-server communication connection request to SSI 1560, the server may take other action. For example, it may respond to the request by sending to CSI 1520 a message or response identifying SSI 1560. The CSI may then re-issue the connection request to the SSI instead of the server. In this example, the response from the server to the CSI may be in the form of an acknowledgement, or it may take any suitable standard or non-standard form as long as it informs the client-side intermediary of the server-side intermediary's existence.

In embodiments of the invention reflected in FIG. 16, an intercept module within server 1550 may perform address translation or other processing to promote transparency and make it appear to the target application or service that the communication session with SSI 1560 is directly terminated with client 1510 instead of the SSI. Similarly, CSI 1520 may terminate its connection with the client to make it appear to the client that the connection is directly terminated with server 1550.

As shown in FIG. 16, following establishment of the split-terminated client-server connection, a client request may be encrypted with a key corresponding to session Sc (if the session is encrypted) and delivered to CSI 1520. CSI 1520 may extract the request, encrypt it with a key corresponding to session Si and forward it to SSI 1560. The SSI may extract or reconstitute the request, encrypt it with a key corresponding to session Ss and deliver it to server 1550. The server's response to the data request may be processed in the reverse order to pass through SSI 1560 and CSI 1520 before being delivered to the client.

Connection process 1600 of FIG. 16 thus depicts the interception and split-termination of a client-server communication connection between a client and a cloud-based server, while allowing intervening network intermediaries to participate in the connection to optimize or otherwise transform transactions between the client and the server.

One of ordinary skill in the art will appreciate that establishment of a given communication connection may involve the exchange of various messages, not shown in FIG. 16, but which are dictated by the operative communication protocol(s). Establishment of a connection may also depend on whether authentication is required.

Figure 17:
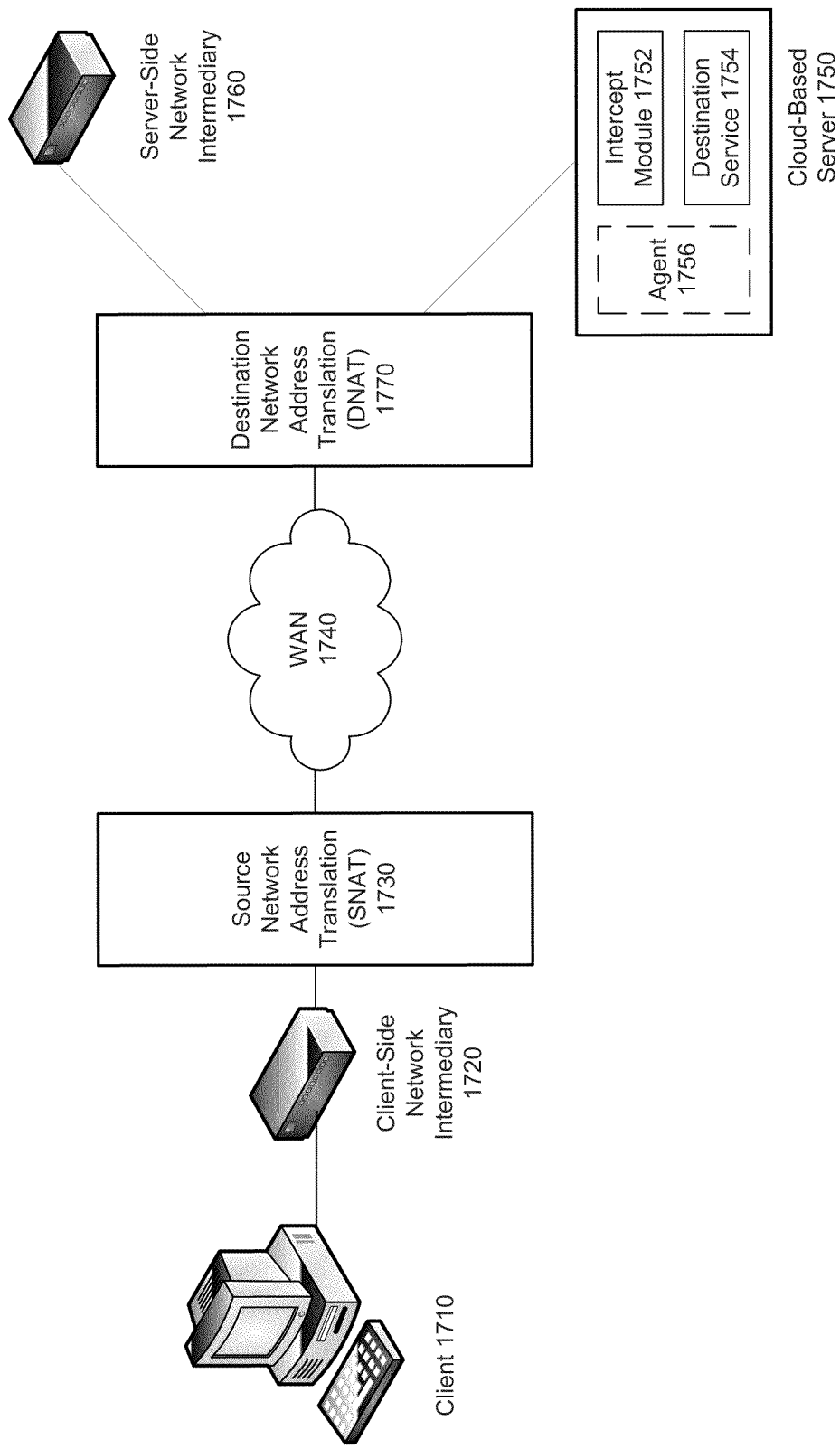
FIG. 17 is a block diagram of another computing environment in which a client-server communication connection involving a cloud-based server may be intercepted, according to some embodiments of the invention.

FIG. 17 illustrates a network environment that includes network address translation (NAT), but wherein interception and split-termination of a client-server communication connection may still be provided, according to some embodiments of the invention. The client-server communication connection involves client 1710 and cloud-based server 1750, and is split-terminated and optimized (or otherwise transformed) through cooperation between client-side intermediary (CSI) 1720 and server-side intermediary (SSI) 1760.

The client-side and server-side intermediaries may learn of each other's existence as described previously, through the use of probes and/or by redirection of a client connection request from a server to the server-side intermediary.

In FIG. 17, device 1730 performs source network address translation (SNAT) on a client side of WAN 1740, while device 1770 performs destination network address translation (DNAT) on a server side of the WAN. NAT devices 1730, 1770 may comprise routers, bridges, switches or other network devices capable of performing network address translation. Although a single DNAT device is illustrated in FIG. 17, in other embodiments, server 1750 and SSI 1760 may be coupled to different DNAT devices.

NAT devices 1730, 1770 may be operated by organizations different from those that operate network intermediaries 1720, 1760. Thus, the task of intercepting and split-terminating client-server communication sessions may be more difficult in the environment of FIG. 17 than in other environments.

Server 1750 comprises intercept module 1752 which, as described above, operates to deflect or redirect client-server connection requests to SSI 1760. Destination service 1754 comprises a service or application that is the target of a client-server connection request.

Intercept module 1752 and destination service 1754 may execute in any host or guest operating system instances on server 1750, and need not be co-located in a single instance. However, intercept module 1752 is configured to receive requests for service 1754 from some or all clients, including client 1710.

Due to the operation of SNAT device 1730 and DNAT device 1770, and/or other factors (e.g., the configuration of server 1750), some or all network entities in FIG. 17 may have separate "private" and "public" network (e.g., IP) addresses. Therefore, the source and destination addresses of any given packet or message transiting the environment of FIG. 17 may or may not uniquely identify the source and destination network entities, or may even identify a NAT device instead of an end node such as client 1710 or server 1750.

For example, if client 1710 and CSI 1720 are part of an organization's LAN served by SNAT device 1730, they may use their private addresses for communicating with other devices on that LAN (including the SNAT device), but any communications sent to devices outside the LAN (e.g., across WAN 1740) may configured with a single public address different from the private addresses, such as an address of SNAT device 1730.

In this example, connection requests from multiple LAN nodes, including client 1710 and CSI 1720, may transit WAN 1740 and be received at server 1750 or SSI 1760 with the same origination address. Similarly, messages dispatched from server 1750 and/or SSI 1760 may be altered by DNAT 1770 to replace a private address with a public address, which may correspond to the DNAT device.

Network address translation may therefore have the potential to frustrate the interception and split-termination of a client-server connection, and/or make it more difficult to make the split-termination transparent to the client and the server. In a transparent connection, a client believes it is connected directly to the server (e.g., instead of a client-side intermediary or proxy), and the server believes it is connected directly to the client (e.g., instead of a server-side intermediary or proxy).

As previously mentioned, the network intermediaries may establish a channel to be used as part of any number of end-to-end client-server connections. Through this channel they can exchange information such as public/private addresses of themselves, and addresses of clients and/or servers as they become aware of them. This will make it easier to map client-CSI connections and server-SSI connections (and ensuing service requests and responses) to the correct client-server connections.

For example, in some embodiments of the invention, after the CSI learns that the SSI is available (and they have established an intermediary channel) the CSI may modify a client-server connection request from client 1710 to direct the request to SSI 1760 instead of server 1750, using either the private address or public address of the SSI. However, SNAT 1730 may perform NAT on the source address of the request when it is transmitted from the SNAT device (e.g., to use a single public address for requests for multiple entities coupled to the SNAT device).

Without additional information, when the request is received at the SSI, the server-side intermediary may be unable to uniquely identify the client (i.e., because the indicated origination address of the request may match origination addresses of requests from other clients), and this may frustrate attempts to promote network transparency. Therefore, CSI 1720 may separately inform the SSI of the client's private address via the intermediary's communication channel, and associate that private address with the client's request. Thereafter, that private address may be used to terminate the server end of the client-server connection and thereby promote transparency.

Or, the CSI may insert the client's private address into a field of the request that will not be altered or dropped by the SNAT device on its way to the SSI, or take other action to inform the SSI of the client's private address. The SSI can thereafter maintain a mapping between the client's public/private addresses, as needed.

In environments in which a client-side intermediary is unaware of its public address and/or a client's public address, it may still forward new client-server connection requests to the server-side intermediary. The SSI may correlate public and private addresses by matching an address of the request (e.g., as modified by SNAT device 1730) with information embedded in the request by the CSI, or by using information sent separately by the CSI via the intermediaries' communication channel.

In yet other embodiments of the invention, a first (or periodic) connection request from a given client may be forwarded to server 1750 instead of being directed to SSI 1760 by CSI 1720 (especially if the SSI has not yet been discovered). The server may then forward the request to the SSI (if it is suitable for optimization), which will allow the SSI to observe the client's public address within the request. The client's private address may be observed and passed to the SSI by the CSI when the CSI receives the SSI's acknowledgement of the connection request.

Regarding the server side of a client-server communication connection, server 1750 may only be known to clients by its public address, which may correspond to DNAT device 1770 and/or be shared with other server instances. When the CSI intercepts a client's connection request directed to the server, it may redirect the request to the SSI (if the intermediaries have already discovered each other) and embed the destination server's address in the redirected request or pass it via the intermediaries' channel.

In order to ensure that SSI 1760 connects to the correct server for the SSI-server portion of each split-terminated client-server connection, it may maintain a table, database or other data structure for mapping between servers' public and private addresses. This data may be populated with information received from the servers, client-side intermediaries and/or other entities, and may be used to facilitate client-server connections.

For example, when CSI 1720 intercepts and redirects a connection request to SSI 1760, it may identify the desired connection using the client's private address and the server's public address, possibly because these are the addresses provided by the client and/or are the only client and server addresses that the client-side intermediary knows. Using its stored data, the server-side intermediary can identify server 1750 and map the public address to the server's private address it will use to communicate with the server.

In the interest of transparency, when SSI 1760 establishes the server-SSI portion of the client-server connection, it may use a public address of the client. Similarly, CSI 1720 may use the server's public address when establishing the client-CSI portion of the connection.

In some embodiments of the invention, an agent such as agent 1756 of FIG. 17 may be installed on server 1750 to communicate either or both the server's public and private addresses to SSI 1760 and/or some other entity. Illustratively, a network node (e.g., possibly separate from any intermediaries and server 1750) may provide a service to collect server address information from server agents, or to monitor servers and server instances to garner such information, and to distribute it to intermediaries.

A server agent may operate separate from, or as part of, an intercept module. A corresponding agent for receiving/maintaining address information may operate on a server-side intermediary.

In some embodiments of the invention, an intercept module such as module 1752 of FIG. 17 may be employed in a computing environment that omits NAT devices 1730, 1770. For example, as described in conjunction with FIG. 15, an intercept module may be employed in a cloud-based server to promote transparency between a client and the server. In particular, the intercept module may terminate a server-SSI portion of a client-server connection and make a connection to the client's desired application or service using the client's network address.

In some other embodiments of the invention, entities' private/public addresses may be captured during the exchange of probes, as part of an auto-discovery process of network intermediaries. In these embodiments, such addresses may be transported to client-side intermediaries within probe responses, and can then be provided as needed to one or more server-side intermediaries.

Figure 18:
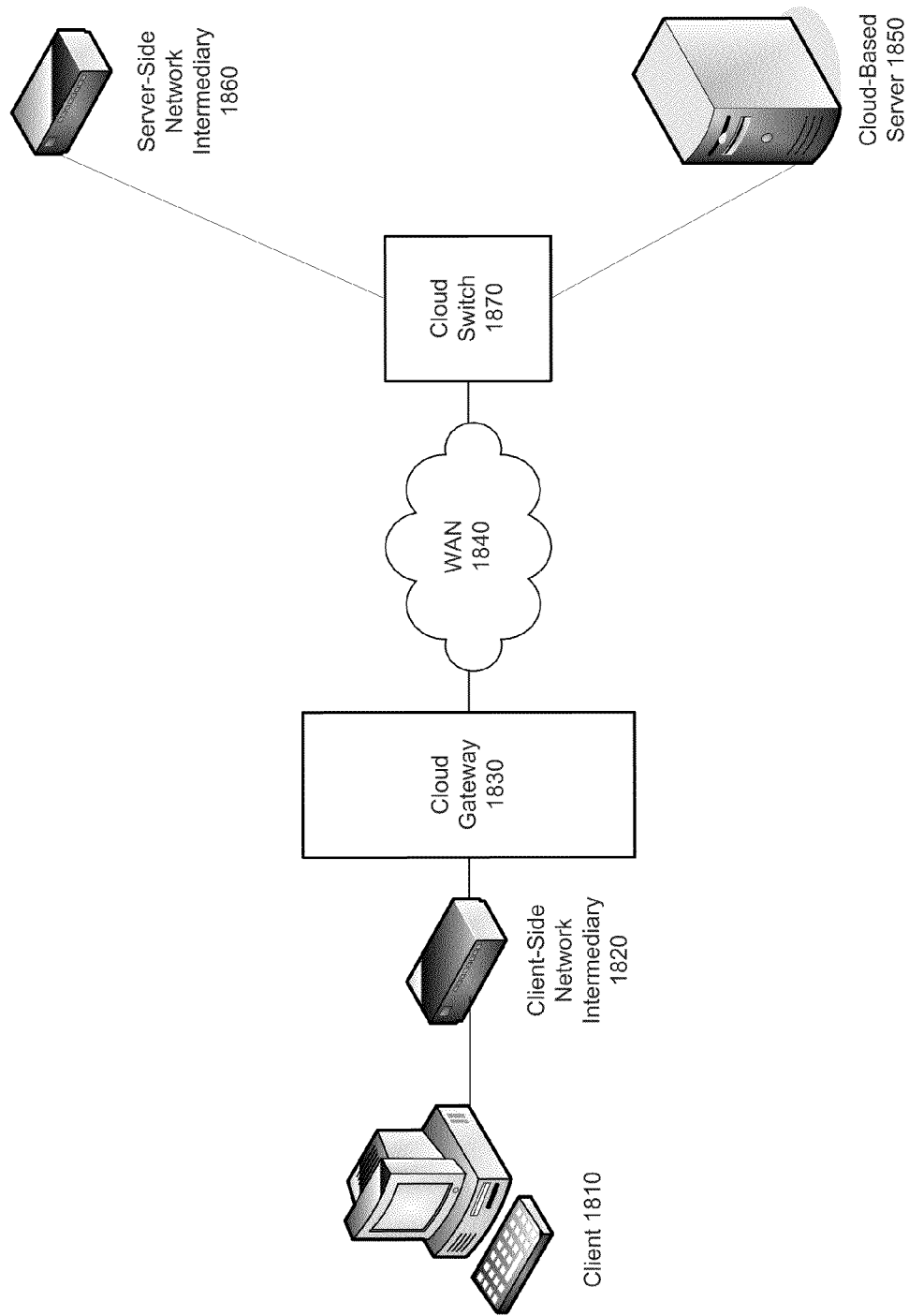
FIG. 18 is a block diagram of yet another computing environment in which a client-server communication connection involving a cloud-based server may be intercepted, according to some embodiments of the invention.

FIG. 18 is a block diagram of a computing environment in which one or more other embodiments of the invention may be implemented. In these embodiments, other network components are employed to support split-termination of optimizable client-server connections, without requiring modification to a server or client. In particular, no agent or intercept module is required to operate on the server.

In the computing environment of FIG. 18, cloud gateway 1830 is virtually installed between client-side intermediary 1820 and WAN 1840, and cloud switch 1870 is virtually installed between the WAN and both server 1850 and server-side intermediary 1860. Devices 1830, 1870 may or may not provide NAT services. In some implementations, cloud gateway 1830 is a layer 3 router or a layer 2 bridge, while cloud switch 1870 is a layer 2 switch that supports virtual LANs, or a layer 3 router that performs policy-based routing to redirect some traffic to the SSI.

Illustratively, if implemented as a layer 2 device, the cloud gateway may act selectively based on the source and/or destination MAC (Medium Access Control) addresses of communications. For example, communications originating from selected clients (e.g., client 1810) may be specifically directed to switch 1870.

In some embodiments, communication channels or tunnels may be established between various entities, such as between cloud gateway 1830 and cloud switch 1870, between cloud gateway 1830 and SSI 1860, between SSI 1860 and server 1850, etc. The channels may be established using GRE (Generic Routing Encapsulation), UDP, PPTP (Point to Point Tunneling Protocol), L2TP (Layer 2 Tunneling Protocol), VPLS (Virtual Private LAN Service) or virtually any other suitable communication protocol, and may employ IPSec (Internet Protocol Security) or some other encryption scheme. Either or both cloud gateway 1830 and cloud switch 1870 may be provided as cloud or virtual services.

Communications destined for the cloud (e.g., a cloud-based server) from entities served by cloud gateway 1830 may be encapsulated and directed to switch 1870. The switch examines such communications, and directs requests for optimizable connections to SSI 1860 (or some other SSI), and forwards other communications toward their desired destinations.

In some alternative embodiments of the invention not illustrated, some functionality of a server-side intermediary may be implanted in a cloud-based server. Illustratively, an intercept module or agent module executing on the server may be configured to terminate client-server connections in place of the SSI.

In these embodiments, once the server (e.g., the intercept module, the agent) and a client-side intermediary become acquainted, such as via auto-discovery, the CSI and the server establish a tunnel or channel to be used for one or more client-server connections. The intercept module or agent may terminate the connection, on behalf of a client, with the application or service requested by the client.

In order to optimize (or otherwise enhance) client-server transactions in these embodiments of the invention, when the server (e.g., the intercept module, the agent) receives an optimizable transaction, it may forward it to a server-side intermediary if the corresponding functionality was not also imported into the server.

FIGS. 19A through 19D are timing charts demonstrating illustrative communication handshaking procedures applied in some embodiments of the invention to establish a client-server communication connection. The illustrated procedures may be applied in different environments, depending on factors such as which entities are "in the cloud," whether a software module (e.g., an intercept module, an agent) can be installed on a server, whether entities have two or more addresses (e.g., public and private), which entities know which addresses (e.g., public, private) of which other entities, whether NAT is performed, whether a network intermediary is in a path of client-server communications, and so on.

In these figures, SYN, SYN/ACK and ACK messages represent corresponding messages exchanged to establish a communication session. Not all messages necessary to establish a session are necessarily illustrated, and additional communications may be exchanged to enable authentication and/or for other purposes. In the illustrated embodiments of the invention, the proxy devices (or network intermediaries) learn of each other's presence before or during the handshaking (e.g., through a probe process).

A client, a first proxy device (e.g., a client-side intermediary), a second proxy device (e.g., a server-side intermediary) and a server may be referred to with the abbreviations "C", "PD1", "PD2" and "S", respectively, in the handshaking messages. The prefixes "Pu" and "Pr" are applied to indicate that the corresponding message uses a public or private network address, respectively, of the originator or destination of the message. For example, "PuPD1" refers to a public address of proxy device 1, while "PrS" refers to a private address of the server. Messages received or initiated by the server in the illustrated procedures may be handled by an intercept module, an agent module or an application or service desired by the client.

Procedure 1900 of FIG. 19A may be applied in an environment in which PD2 and the server are in the cloud, and PD2 is not in a direct communication path between the client and the server. The client is not in the cloud, but network address translation may be active in the LAN in which the client resides. PD1 may be physically connected to this LAN, and may be programmed to redirect to PD2 client connection requests that target an address of the server.

In this procedure, PD1 intercepts a connection request that was initiated at time 1902 from the client and that was directed to an address of the server (e.g., a public or private address of a desired service). Assuming the proxy devices are acquainted (e.g., have formed a proxy pair through auto-discovery), PD1 establishes a connection with PD2 (assuming one is not already available for use with this client-server connection). The proxy devices' connection is active at time 1904, and may employ encryption key Ki.

Although PD1 may already be aware of PD2 in embodiments of the invention reflected in FIG. 19A, in other embodiments it is not. In these embodiments, the SYN message issued from PD1 may comprise a probe, and PD1 therefore learns of PD2's existence through an auto-discovery process described previously, which may involve redirection or deflection of the client's connection request.

A router or other device configured to perform NAT is positioned between the proxy devices (e.g., at either or both ends of an intervening WAN), and therefore source and/or destination addresses of a message transmitted from one PD to the other may be altered. For example, the SYN message from PD1 to PD2 in FIG. 19A is transmitted from PD1 as indicated, using the only address of PD1 that it knows of (e.g., a private address represented as PrPD1). However, the router (or other device) converts this into a public address associated with PD1 (i.e., PuPD1), which may be an address of the router. Similarly, while PD1 may direct the client's connection request to a public address of PD2 (i.e., PuPD2), the router or other intervening device may replace this with a private address of PD2 (i.e., PrPD2). Messages passed in the opposite direction may be modified accordingly, to replace PuPD1 with PrPD1 and to replace PrPD2 with PuPD2.

After the proxy devices' connection is established, PD2 establishes a session with the server, and PD1 establishes a session with the client. Thus, a key Ks for the server-PD2 session may be generated at time 1906, while key Kc for the client-PD1 session may be derived at time 1908. Subsequently, client requests and server responses are relayed through the split-terminated connection and may be encrypted with the session keys as indicated in FIG. 19A.

Figure 19B:
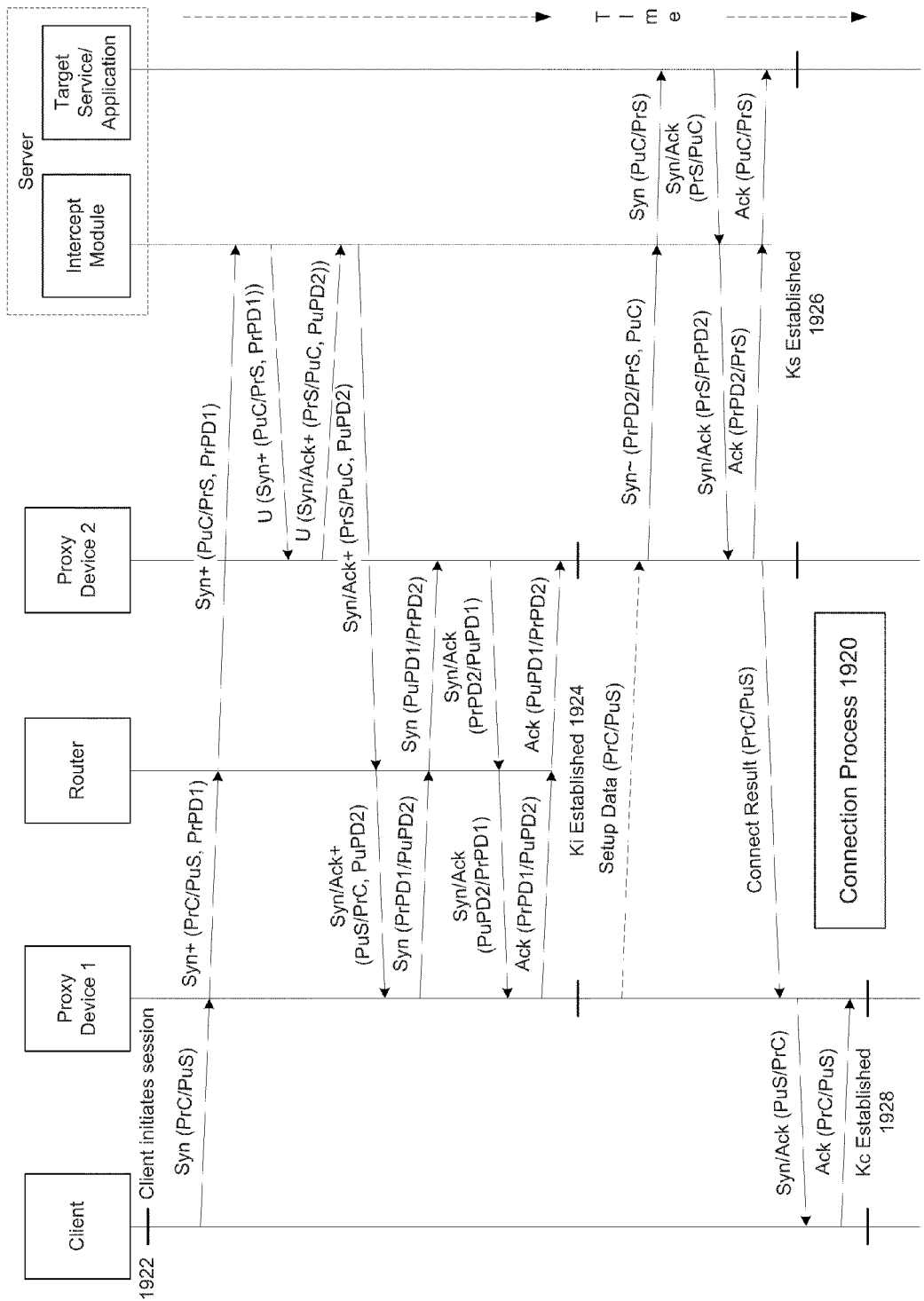

FIG. 19B illustrates connection process 1920, and may be applied in an environment in which PD2 (server-side proxy device) and the server are in the cloud, and PD2 is not in a direct communication path between the client and the server, comparable to that of FIG. 19A. The client may or may not be in the cloud, but network address translation may be active in a LAN in which the client resides (if not in the cloud). PD1 (client-side proxy device) may be physically connected to this LAN.

In the illustrated embodiment, an intercept module, agent or other software entity operates on the server to facilitate discovery of PD2 by PD1, and/or to redirect requests for optimizable client-server connections. This module is aware of at least a private address of PD2.

In connection process 1920, messages having "+" as a suffix indicate the presence of a probe or probe response. For example, a SYN+ message may comprise a probe from PD1, while a SYN/ACK+ message may comprise a probe response from PD2 or other entity (e.g., the intercept module). A message suffixed with "~" (e.g., a SYN~ message) contains original client-server connection addresses, and is issued by the server-side proxy device to the intercept module. The intercept module uses this address information to promote network transparency.

In connection process 1920, in response to the client's connection request at time 1922, PD1 issues a connection request comprising a probe. The request provides an address of the client (e.g., a private address) and a publicly known address of the server or target service/application. PD1's request is dispatched to the same server address and identifies a private address of PD1 (e.g., for use by any server-side proxy device or intercept module that may intercept the request).

A router or other device may perform NAT on the request to replace the client's address with a public address and to replace the destination's public address (PuS) with a private address (PrS). Because PD2 is out-of-path (i.e., not physically installed in a communication routing path between PD1 and the server), the request is delivered to the target server or to a server hosting the target service.

An intercept module (or other software hosted by the server) determines that the connection request should be redirected to a server-side proxy, and therefore responds by forwarding, reissuing or otherwise relaying the connection request to PD2. The "U" prefix to this message indicates that the redirected request may be transmitted via encapsulation, such as with a UDP datagram.

In different embodiments of the invention, the intercept module may determine through different means that the connection request should be diverted to a server-side proxy device. For example, any connection request to specific addresses, applications or services may be redirected. Or, connections from particular clients (e.g., based on PuC or other address, such as a MAC address) or client-side proxy devices (e.g., based on PrPD1 or PuPD1) may be diverted.

The server (e.g., the intercept module) may redirect different connection requests to different server-side proxy devices. Further, the intercept module may issue periodic heartbeat messages to server-side proxy devices to determine if they are alive.

Upon receipt of the redirected connection request, PD2 will submit the connection request to the server (e.g., the intercept module) as if it had received the original client connection request from PD1. The submitted request may include a public address of PD2, which may be needed by the server for various purposes (e.g., to pass on to PD1, to populate or update a mapping of the proxy device's public and private addresses).

The server (e.g., the intercept module) then responds to the request from PD1 by acknowledging the request and identifying PD2 to PD1 (e.g., by public address). The router may modify the message to map a public address of the client back to a private address).

The proxy devices then establish a communication channel, and form a proxy pair, by exchanging appropriate SYN, SYN/ACK and ACK messages, which the router may update through network address translation as appropriate.

When their channel is established at time 1924, and key Ki is available for securing their communications, the client-side proxy device may submit connection-specific information to the server-side proxy for use in setting up the immediate client-server connection. This information may include, but is not limited to, the client's private address and a public (and/or private) address of the target server or service.

PD2 then terminates one end of the client-server connection by prompting the intercept module to establish a connection with the target service. The server-side proxy device supplies the client's private address to the intercept module so that the intercept module can perform network address translation and terminate the connection with the service in such a manner that it appears to the service that the connection is terminated directly with the client.

Thus, at time 1926, the server end of the client-server communication connection may be established, and key Ks may be available for encrypting communications transiting this portion of the connection.

PD2 then reports completion of the server end of the connection to PD1, which may acknowledge the connection to the client and thereby terminate the client end of the client-server connection at time 1928. Key Kc may be used to secure communications at this end of the connection.

Figure 19C:
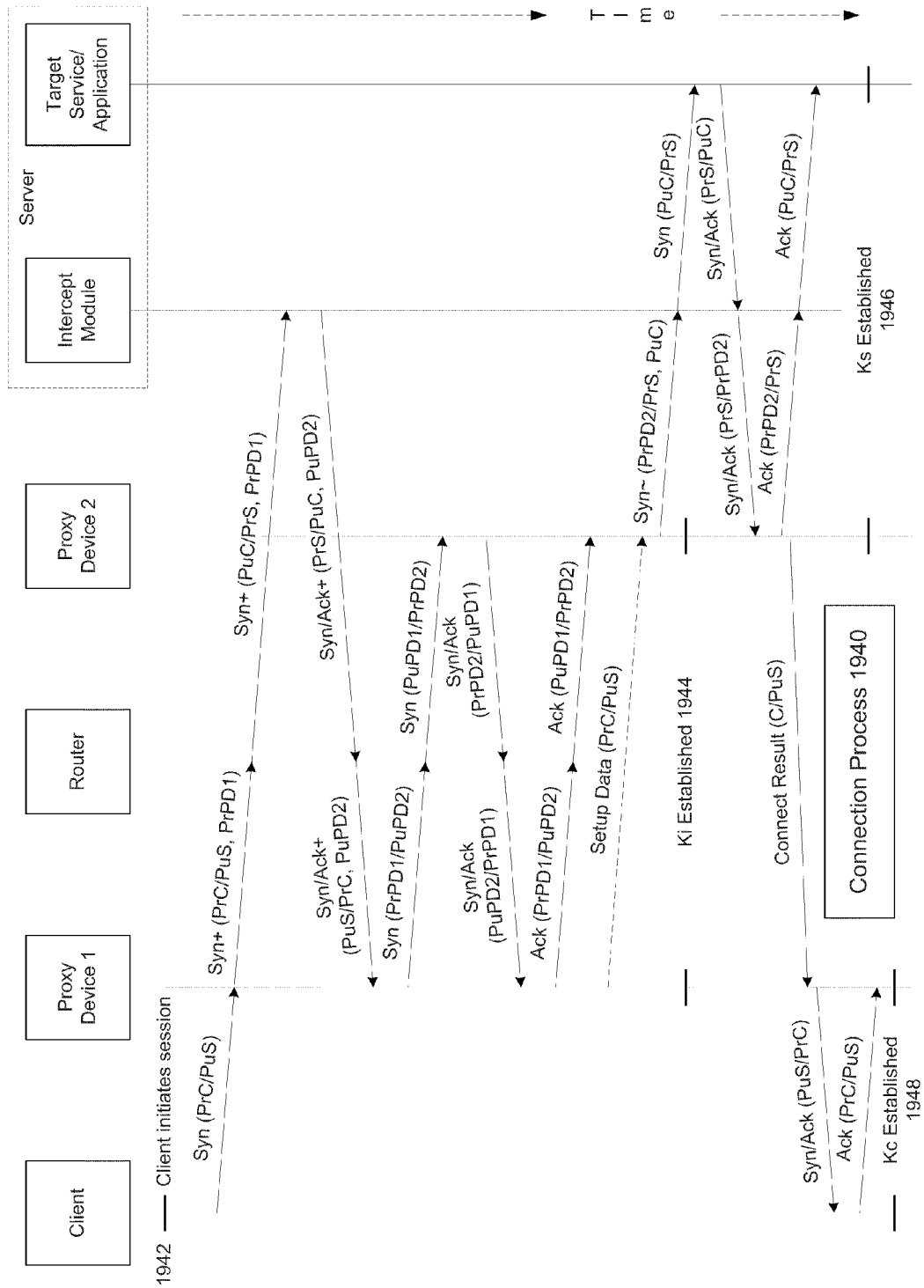

FIG. 19C illustrates connection process 1940, which, like process 1920 of FIG. 19B, may be applied in an environment in which the server and server-side proxy device are both in the cloud, and an intercept module, agent or other software module is installed on the server to facilitate discovery of the server-side proxy device (PD2) by a client-side proxy device (PD1) and/or to redirect or otherwise respond to requests for optimizable client-server connections. Prior to initiation of the illustrated connection process, this module knows at least a public address of PD2, or is capable of retrieving it when needed.

Through an auto-discovery process, PD2 is identified to PD1 so that they may form a proxy pair for the purpose of optimizing or otherwise processing one or more client-server connections. As in connection process 1920 above, messages having "+" as a suffix indicate the presence of a probe or probe response. For example, a SYN+ message may comprise a probe from PD1, while a SYN/ACK+ message may comprise a probe response from PD2 or other entity (e.g., an intercept module).

In connection process 1940, PD1 issues a probe connection request in response to the client's connection request at time 1942; the original request comprises provides an address of the client (e.g., a private address) and a publicly known address of the server or target service/application. PD1's probe request is dispatched to the same server address and identifies a private address of PD1 (e.g., for use by any server-side proxy device or intercept module that may intercept the request).

A router or other device performs NAT on the request to replace the client's private address with a public address and to replace the destination's public address with a private address. Because PD2 is out-of-path (i.e., not physically installed in a communication routing path between PD1 and the server), the request is delivered to the server.

An intercept module (or other module) determines that the connection request should have been directed to a server-side proxy, and therefore responds by directing to PD1 a message that reports a publicly usable address of PD2. In different embodiments of the invention, the intercept module may determine through different means that the connection request should be diverted to a server-side proxy device, such as described above.

Thus, one difference between connection process 1920 of FIG. 19B and process 1940 of FIG. 19C is that in process 1920, a connection request and probe are redirected to a server-side intermediary (or proxy device) that handles optimizable connections for the target server/service, while in process 1940 a request and probe are reflected back to their originator with information identifying the server-side intermediary.

When the server's response reaches the router, the public address of the client (PuC) is mapped back to the original address (PrC) and the message is delivered to PD1.

The client-side proxy then issues a replacement or substitute connection request toward PD2, using the public address (PuPD2) provided by the server. The router replaces the client's side proxy's address (e.g., a private address) with a public address (and replaces PuPD2 with PrPD2) and forwards the request. PD2 and PD1 now form a proxy pair, and PD1 can provide details of the desired client-server connection (e.g., addresses of client and server) to PD2. At time 1944 a proxy tunnel is established, and key Ki may be used to secure communications that traverse the tunnel.

PD2 can now establish the server-proxy portion of the client-server connection, which may also be used to support client-server connections involving other clients (e.g., unless the client's private address is used to promote transparency). To set up the server-proxy session, PD2 issues to the server a connection request from its private address (PrPD2). As indicated, this connection request may be directed to a private address of the server. Alternatively, the request may be directed to a public address of the server.

The intercept module recognizes the connection request, and intercepts it. As with the SYN~ message of process 1920 above, this request contains an address identifying the client on whose behalf the connection is being made. Using the information provided by PD2, the intercept module establishes a session with the client's desired application or service.

The server communication session may be generated using the client's public address so as to promote transparency, or may alternatively use the client's private address. At time 1946, a server-proxy session is established and may be protected using key Ks.

The client-proxy portion of the split-terminated client-server connection is established between the client and PD1, using the addresses provided by the client so as to promote transparency. Thus, at time 1948, the client-proxy session is established and may be protected using key Kc.

In an embodiment of the invention depicted in FIG. 19C, because NAT is performed for the server-side proxy, PD1 may not be able to connect to PD2 using a private address (PrPD2), and vice versa, perhaps because it is unaware of that private address or because the NAT device will drop a communication directed to PD2's private address. The intercept module, an agent, a portal or some other service may maintain a mapping between a proxy's public and private addresses (and provide such information to the client proxy) in order to facilitate proxy pairing.

Similarly, a server-side proxy may not know, or may be unable to connect to, a public address of the server (PuS). Thus, a mapping between a server's public and private addresses may be maintained as described above.

In some embodiments of the invention, in the SYN/ACK+ probe response from the intercept module to PD1, a private address of the server may be provided (in addition to PuPD2). This private address may then be passed from PD1 to PD2, possibly as part of the connection setup data.

In other embodiments, a TCP connection may be established between PD2 and the intercept module (or the target service/application) so as to avoid or overcome the need to map between public and private addresses of the server. Or, in order to set up the server-proxy session, PD2 may be configured to issue a special message (e.g., another form of a SYN) to PuS, which would be intercepted by the intercept module. The intercept module could then respond with a message (e.g., an RST) identifying PrS so that the proxy could connect to the server's private address.

Figure 19D:
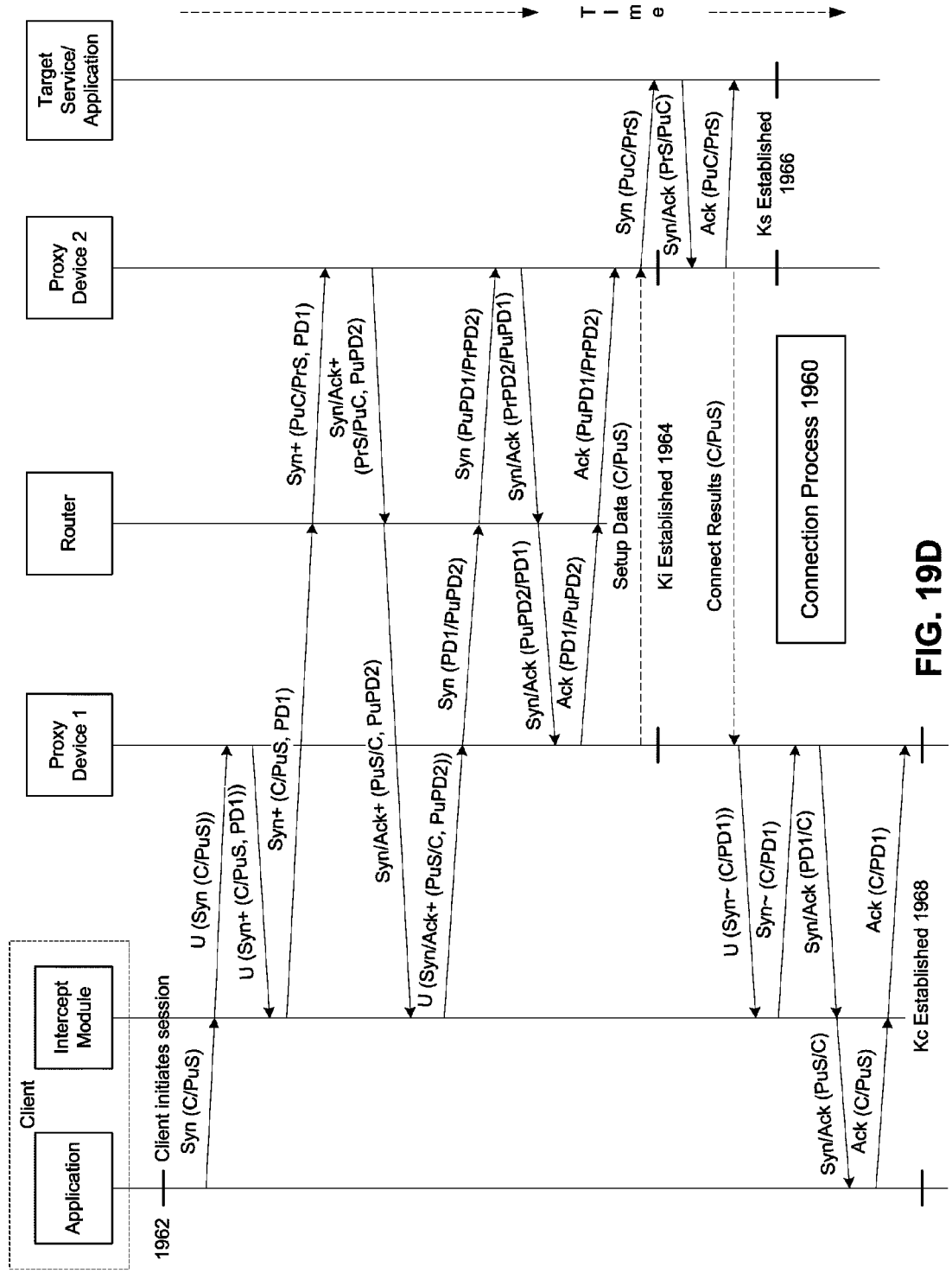

FIG. 19D illustrates connection process 1960, and may be applied in an environment in which a client is in the cloud, and a client-side proxy device may be in the cloud, but a target server and a server-side proxy device are not. An intercept module, agent or other software entity operates on the client to facilitate discovery of PD1 by the client application attempting to open a connection with the server.

In the environment of FIG. 19D, an intercept module, agent or other software entity executes on the client to allow the client to find an available or suitable proxy device through which to initiate an optimizable client-server connection. The client intercept module may be configured with addresses or instructions for finding a proxy device, dispatching a probe and/or taking other action to facilitate establishment of the client-server connection. For example, it may perform address translation to make a client portion of the split-terminated client-server connection appear to terminate directly with the target server.

In connection process 1960, after the client initiates a client-server communication connection at time 1962, a client intercept module intercepts the connection request and redirects it to a client proxy device (PD1). The client proxy device returns to the intercept module a probe configured to identify that proxy device. The intercept module dispatches the probe toward the destination server/application.

An in-path server proxy device (PD2) intercepts the probe, and responds by identifying itself (and the connection request to which it is responding).

This response is returned to the client intercept module, which notifies PD1 of PD2's existence. The proxy devices then form a proxy pair (by time 1964) and exchange connection data.

The server proxy device then establishes the server side of the client-server communication connection by time 1966 and informs the client proxy device of this action. The client side of the communication connection can then be established by time 1968.

Figure 20B:
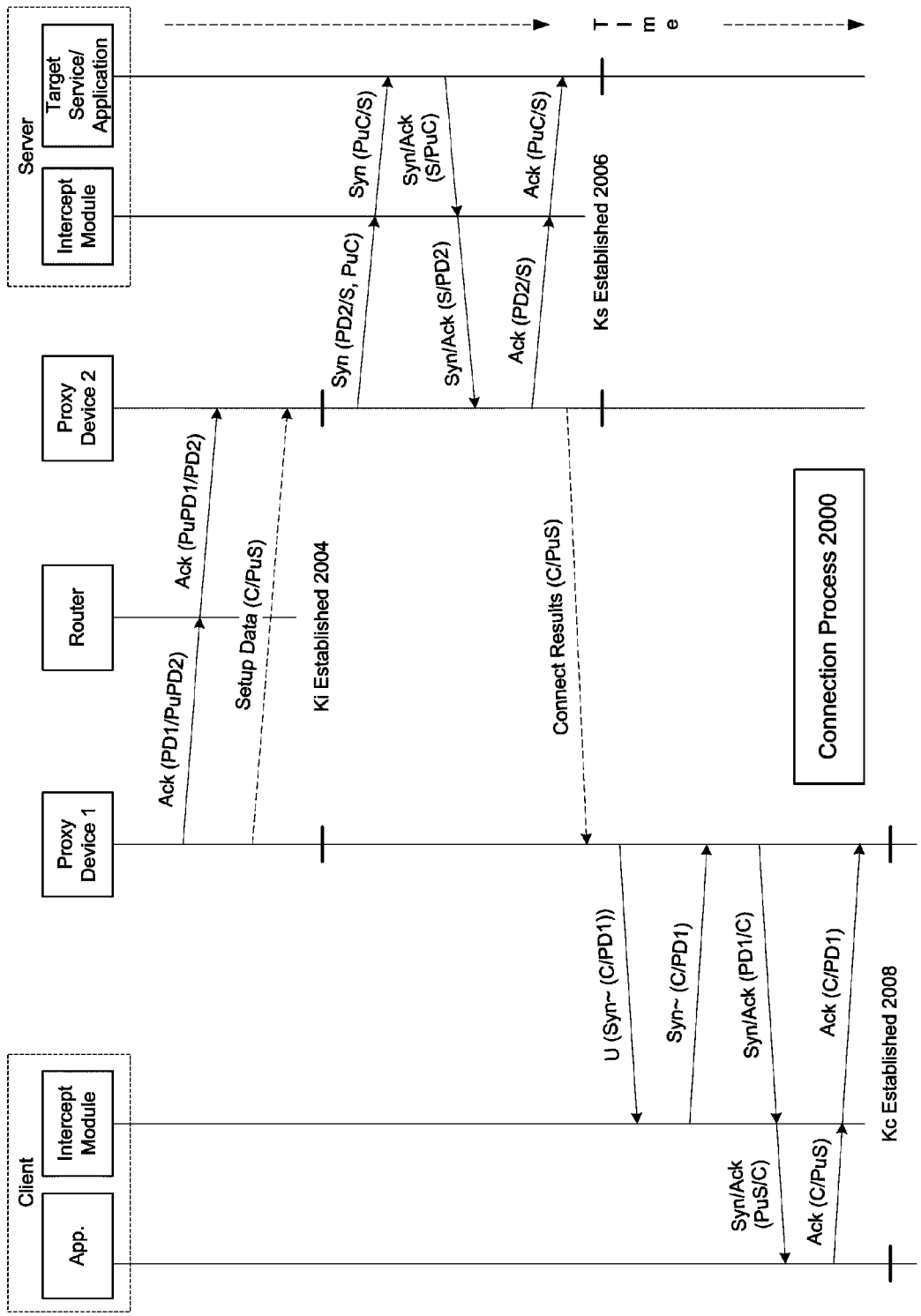

FIGS. 20A-B illustrate connection process 2000, which may be applied in an environment in which both a client and a server are in the cloud and may be positioned behind NAT devices. Each of the client and the server employ (or are deployed with) intercept modules, which operate as described previously. Thus, connection process 2000 and/or other methods of facilitating interception of a client-server connection when both entities are in the cloud may be derived from combinations of processes described above, such as connection processes 1920, 1960 of FIGS. 19B and 19D.

In connection process 2000, entity addresses not specifically prefixed with an indication of whether the address is public or private (e.g., C, PD1, PD2) may represent private addresses in some implementations of this embodiment of the invention.

As described in association with connection processes depicted in preceding figures, the client's communication connection request issued at time 2002 is intercepted by a client intercept module, which communicates with a client proxy device (PD1). PD1 generates a probe for the intercept module to dispatch toward the target service/application.

The probe is intercepted by the server's intercept module, which notifies a server proxy device (PD2). The intercept module then responds to the probe by identifying the server proxy device, and this information is received by the client intercept module and reported to the client proxy device.

Thereafter, the client-server communication connection can proceed normally, meaning that the proxy devices establish a proxy connection by time 2004 and then separately establish server and client sides of the client-server connection by times 2006 and 2008, respectively.

FIGS. 19 and 20 reflect some specific handshaking processes that may be employed to intercept a client-server communication connection for the purpose of facilitating optimization of the connection. Other comparable processes may be employed in without exceeding the scope of the invention. For example, different entity addresses (e.g., public, private) may be used for particular messages, the order in which messages are transmitted may be modified, the manner in which particular information is conveyed may be altered, and so on.

Thus, the above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The environment in which an embodiment of the invention is executed may incorporate a general-purpose computer or a special-purpose device such as a hand-held computer. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

What is claimed is:

1. A method of facilitating a split-terminated client-server communication connection between a client and a server, wherein the server operates in a virtual cloud computing environment, the method comprising:
   at a first network intermediary located in a path of communication between the client and the server:
      receiving from the client a request for the client-server connection;
      transmitting a request for the client-server connection toward the server; and
      terminating the client-server communication connection at the first network intermediary;
   at the server:
      receiving the request for the client-server connection; and
      without having responded to the request, redirecting the request for the client-server connection to a second network intermediary that is not in the path of communication between the client and the server; and at the second network intermediary:
      establishing an intermediary communication connection with the first network intermediary if the intermediary communication connection does not exist; and
      terminating the client-server communication connection at the second network intermediary.

2. The method of claim 1, wherein said redirecting the request for the client-server connection comprises:
   forwarding to the second network intermediary the request for the client-server connection.

3. The method of claim 1, wherein said redirecting the request for the client-server connection comprises:
   notifying the second network intermediary of the request for the client-server connection.

4. The method of claim 1, wherein said redirecting the request for the client-server connection comprises:
   transmitting to the first network intermediary a message identifying the second network intermediary.

5. The method of claim 4, further comprising, at the first network intermediary:
   transmitting toward the second network intermediary a request to establish the intermediary communication connection.

6. The method of claim 1, wherein said receiving the request for the client-server connection comprises:
   receiving the request at the server via a communication path that does not traverse the second network intermediary.

7. The method of claim 1, further comprising, at the server:
   executing an intercept module configured to intercept the request for the client-server connection from the first network intermediary without the request for the client-server connection being delivered to a destination addressee of the request.

8. The method of claim 1, wherein the server comprises a cloud-based server.

9. A method of facilitating establishment of a split-terminated client-server communication connection between a client and a server, the method comprising:
   receiving at the server, from a first network intermediary, a request for the client-server communication connection;
   without acting upon the request, redirecting the request to a second network intermediary that is outside of a path of communication between the client and the server;
   receiving a substitute connection request from the second network intermediary;
   establishing the substitute connection with the second network intermediary; and
   terminating the client-server communication connection at the first network intermediary and the second network intermediary;
   wherein the substitute connection comprises a portion of the split-terminated client-server communication connection; and
   wherein the request for the client-server communication connection was received at the server without transiting the second network intermediary.

10. The method of claim 9, wherein the request for the client-server communication connection comprises a probe configured to determine whether the second network intermediary is located in a path of communications between the first network intermediary and the server.

11. The method of claim 9, wherein said redirecting the request comprises:
    forwarding the request to the second network intermediary.

12. The method of claim 9, wherein said redirecting the request comprises:
    identifying an address of the second network intermediary to the first network intermediary.

13. The method of claim 9, wherein the server comprises a cloud-based server.

14. A non-transitory computer-readable medium storing instructions that, when executed by a computer, cause the computer to perform a method of facilitating establishment of a split-terminated client-server communication connection between a client and a server, the method comprising:
    receiving at the server, from a first network intermediary, a request for the client-server communication connection;
    without acting upon the request, redirecting the request to a second network intermediary that is outside of a path of communication between the client and the server;
    receiving a substitute connection request from the second network intermediary;
    establishing the substitute connection with the second network intermediary; and
    terminating the client-server communication connection at the first network intermediary and the second network intermediary;

wherein the substitute connection comprises a portion of the split-terminated client-server communication connection; and wherein the request for the client-server communication connection was received at the server without transiting the second network intermediary.

15. The non-transitory computer-readable medium of claim 14, wherein the server comprises a cloud-based server.

16. A system for facilitating a split-terminated communication connection between a client and a server, the system comprising:
- a first network intermediary having a first memory and a first processor, coupled to the client and comprising:
- a client communication program module configured to receive from the client a request for a client-server communication connection;
- a server communication program module configured to issue a request for the client-server communication connection toward the server; and
- a connection program module configured to terminate the requested client-server communication connection; and
- a second network intermediary, having a second memory and a second processor and comprising:
- a server communication program module configured to issue a substitute request for the client-server communication connection toward the server; and
- a connection program module configured to:
- establish an intermediary communication connection with the first network intermediary; and
- terminate the requested client-server communication connection;
- wherein the first network intermediary is located in a path of communications between the client and the server; and wherein the second network intermediary is not located in the path of communications.

17. The system of claim 16, wherein the server further comprises:
- an intercept module configured to issue a redirection message toward one or more of the first network intermediary and the second network intermediary in response to receipt of the request for the client-server connection.

18. The system of claim 16, wherein:
- the server communication program module of the first network intermediary is further configured to receive from the server, in response to the request for the client-server communication connection, a redirection message identifying the second network intermediary; and
- the connection program module of the first network intermediary is further configured to redirect the request for the client-server communication connection toward the second network intermediary, via the intermediary communication connection, in response to the redirection message.

19. The system of claim 16, wherein:
- the server communication program module of the second network intermediary is further configured to receive, from the server, a redirection of the request for the client-server communication connection; and
- said substitute request is issued in response to said redirection of the request for the client-server communication connection.

20. The system of claim 16, wherein the server comprises a cloud-based server.

* * * * *